(12) United States Patent
Batra et al.

(10) Patent No.: US 12,217,459 B2
(45) Date of Patent: Feb. 4, 2025

(54) MULTIMODAL COLOR VARIATIONS USING LEARNED COLOR DISTRIBUTIONS

(71) Applicant: Adobe Inc., San Jose, CA (US)

(72) Inventors: Vineet Batra, Delhi (IN); Sumit Dhingra, Delhi (IN); Matthew Fisher, San Carlos, CA (US); Ankit Phogat, Uttar Pradesh (IN)

(73) Assignee: Adobe Inc., San Jose, CA (US)

( * ) Notice: Subject to any disclaimer, the term of this patent is extended or adjusted under 35 U.S.C. 154(b) by 607 days.

(21) Appl. No.: 17/359,221

(22) Filed: Jun. 25, 2021

(65) Prior Publication Data

US 2022/0414936 A1     Dec. 29, 2022

(51) Int. Cl.
*G06T 7/90*     (2017.01)
*G06N 3/04*     (2023.01)

(52) U.S. Cl.
CPC .............. *G06T 7/90* (2017.01); *G06N 3/04* (2013.01); *G06T 2207/20081* (2013.01); *G06T 2207/20084* (2013.01)

(58) Field of Classification Search
CPC ............ G06T 7/90; G06T 2207/20081; G06T 2207/20084; G06T 2200/24; G06T 2207/10024; G06T 5/008; G06N 3/04; G06N 3/088
See application file for complete search history.

(56) References Cited

U.S. PATENT DOCUMENTS

| | | | | |
|---|---|---|---|---|
| 8,416,255 B1 * | 4/2013 | Gilra | ...................... | G01J 3/526 715/810 |
| 2018/0122053 A1 * | 5/2018 | Cohen | ...................... | G06T 7/90 |
| 2022/0237831 A1 * | 7/2022 | Saha | ...................... | G06T 11/001 |

FOREIGN PATENT DOCUMENTS

EP     3021282 A1 *     5/2016     ............. G06F 17/16

OTHER PUBLICATIONS

Huiwen Chang, Ohad Fried, Yiming Liu, Stephen DiVerdi, and Adam Finkelstein. 2015. Palette-based photo recoloring. ACM Trans. Graph. 34, 4, Article 139 (Aug. 2015), 11 pages. https://doi.org/10.1145/2766978 (Year: 2015).*

Kita, N. and Miyata, K. (2016), Aesthetic Rating and Color Suggestion for Color Palettes. Computer Graphics Forum, 35: 127-136. https://doi.org/10.1111/cgf.13010 (Year: 2016).*

(Continued)

*Primary Examiner* — Sean M Conner
*Assistant Examiner* — Aaron Joseph Sorrin
(74) *Attorney, Agent, or Firm* — Nicholson De Vos Webster & Elliott LLP

(57) ABSTRACT

Embodiments are disclosed for generating multiple color theme variations from an input image using learned color distributions. A method of generating multiple color theme variations from an input image using learned color distributions includes obtaining, by a user interface manager, an input image, determining, by a color extraction manager, one or more color priors based on the input image, generating, by a color distribution modeling network, a plurality of color theme variations based on the one or more color priors, ranking, by a color theme evaluation network, the plurality of color theme variations, and generating, by a recolor manager, a plurality of recolored output images using the plurality of color theme variations.

20 Claims, 16 Drawing Sheets

(7 of 16 Drawing Sheet(s) Filed in Color)

(56) References Cited

OTHER PUBLICATIONS

Gal Chechik, Varun Sharma, Uri Shalit, and Samy Bengio. 2010. Large Scale Online Learning of Image Similarity Through Ranking. J. Mach. Learn. Res. 11 (Mar. 1, 2010), 1109-1135. (Year: 2010).*
S. Iwasa and Y. Yamaguchi, "Color Selection and Editing for Palette-Based Photo Recoloring," 2018 25th IEEE International Conference on Image Processing (ICIP), Athens, Greece, 2018, pp. 2257-2261, doi: 10.1109/ICIP.2018.8451712 (Year: 2018).*
Q. Zhang, C. Xiao, H. Sun and F. Tang, "Palette-Based Image Recoloring Using Color Decomposition Optimization," in IEEE Transactions on Image Processing, vol. 26, No. 4, pp. 1952-1964, Apr. 2017, doi: 10.1109/TIP.2017.2671779. (Year: 2017).*
Chang et al., "Palette-based Photo Recoloring," ACM Transactions on Graphics, Jul. 2015, 11 pages.

\* cited by examiner

MULTIMODAL COLOR VARIATIONS USING LEARNED COLOR DISTRIBUTIONS

BACKGROUND

Technical Field

The present disclosure relates generally to systems and methods for image processing. More specifically, one or more embodiments of the present disclosure relate to systems and methods for generating multiple color theme variations from an input image using learned color distributions.

Background and Relevant Art

Color is a fundamental component of any visual design, a designer needs to choose a set of colors to convey their intended tone, message and evoke their intended reaction. To create good design and employ colors effectively, designers need to understand the basics of color theory and how they relate to each other which can then be effectively applied in design creating process. During this creation process, professional designers manually create several color variations of their designs. However, manually recoloring a complex graphic is a tedious process, as each color has to be mapped individually and requires expertise to assess the colors that needs to be altered. This greatly limits designers in exploring the space of possible results.

Prior techniques have attempted to directly generate multiple color variations from a given image. For example, one technique creates a factor graph to model the probability of assigning a given color palette to an image. However, this technique requires a well-layered pattern image to create the graph. Other prior techniques focus on either color transfer between images or colorizing a grayscale image. Color transfer between images is an extensively researched problem, and several approaches have been proposed over the years: statistical techniques, palette-based techniques, or more recent neural network-based techniques. However, these techniques are mainly devised for natural images, and also require a designer to provide a reference image for each color variation to be generated. As such, prior techniques require significant input from designers to create variations and are not capable of easily creating multiple direct variations from a given image.

These and other problems exist with regard to generating multiple color theme variations in electronic systems.

SUMMARY

Introduced here are techniques/technologies that enable multiple color theme variations to be generated for an input image. A machine learning model, such as a neural network, is trained to model color distributions. Using the machine learning model, new color themes are predicted for an input image based only on one or more of the colors of the input image. This way, multiple variations are generated for an input image, without requiring the user to provide a reference image that already has the color theme the user wants to apply to the input image.

More specifically, in one or more embodiments, the user provides an input image to a recoloring system. The recoloring system determines a color theme for the input image. For example, the recoloring system determines the colors included in the input image and their relative prevalence. In some embodiments, this is performed using clustering techniques to identify clusters of colors and a representative color from each cluster is included in the color theme. One or more of the colors of the color theme are randomly sampled and provided to a color distribution modeling network to be used as priors. The color distribution modeling network then generates multiple color theme variations that include these colors from the input image.

The color distribution modeling network predicts a probability distribution that represents the likelihood of various colors appearing in a color theme with the one or more color priors. This probability distribution is then sampled to determine a next color in the color theme variation. The input to the color distribution modeling network is then updated to include the color priors and the next color and run again to determine the next color. This is performed iteratively until multiple color theme variations are generated.

Because these color theme variations are generated from a probability distribution, some of the color theme variations are more or less aesthetically pleasing than others. To address this concern, a color theme evaluation network that has been trained to score color themes is then used to score and rank the color theme variations generated by the color distribution modeling network. Once ranked, the best color theme variations are then used to recolor the input image. The user reviews the recolored output images and has the option to further refine any given output image's color theme by changing the colors or changing the relative prevalence of the colors.

Additional features and advantages of exemplary embodiments of the present disclosure will be set forth in the description which follows, and in part will be obvious from the description, or are learned by the practice of such exemplary embodiments.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying drawings in which.

DETAILED DESCRIPTION

Figure 1:
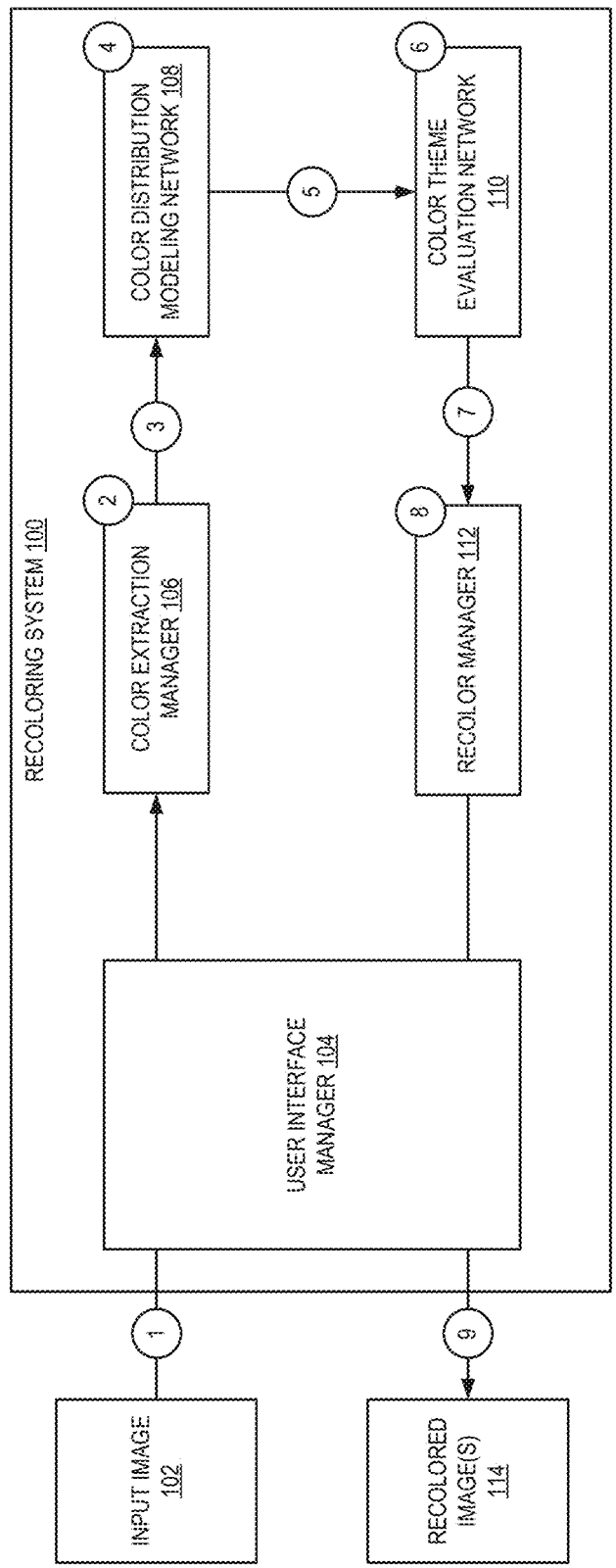
FIG. 1 illustrates a diagram of a process of generating color theme variations in accordance with one or more embodiments.

One or more embodiments of the present disclosure include a recoloring system that is capable of generating multiple color theme variations for a given input image. As discussed, a color theme greatly influences the way in which an image is perceived by the viewer. However, conventional systems generally require the designer to manually recolor images which is tedious and requires expertise to evaluate the color changes being made. Embodiments address these shortcomings by providing a simple and intuitive solution for enabling the exploration of color variations for graphic designs. For example, the recoloring system enables designers to generate multiple color variations with minimal input, making it accessible to new users and beginners. Additionally, the color variations are generated without requiring a reference color palette or image to be first provided by the designer. Embodiments are applicable to both raster and vector graphics.

In some embodiments, the recoloring system implements deep learning-based techniques in which a deep network is trained to learn color distribution from a set of training images and predict harmonious color themes given a variable number of color priors. This trained network is then used for predicting multiple color distributions which use a random sample of color from the input image as a prior. The output of this network is a probability distribution function which allows for an unlimited number of color themes to be sampled from the distribution. Additionally, a second deep network is trained to quantify a color distribution based on its aesthetic quality. This network quantifies (e.g., "scores") co-occurrence of a set of colors in a given sampled color theme based on likelihood of having observed these colors in the training phase. These scores are then used to filter the generated color theme variations to ensure that only "good" color distributions are provided as suggestions. In this context, a "good" color distribution is a color distribution that is similar to those that the network was trained on. Once the color theme variations have been scored, the highest scored color theme variations are used to recolor the input image to generate multiple color theme variations of the input image.

Existing recoloring systems typically require a reference image on which the recoloring is to be based. For example, a designer provides a source image and a reference image. The recoloring system then determines a color palette associated with the reference image and determines how to recolor the source image based on the reference color palette. As such, these techniques typically generate a single colorized result. This requires a designer to have multiple different reference images to be used to apply different color themes to their input image.

Embodiments overcome the deficiencies of the art using machine learning. Accordingly, embodiments are capable of generating infinite color variations without requiring any exemplar images as input. Embodiments further ensures aesthetic quality of the generated variations and provides support for further controlling the extent of these variations.

Term Definitions

As used herein, the term "digital image" or "image" refers to any digital symbol, picture, icon, or illustration. For example, the term "digital image" or "image" includes digital files with the following, or other, file extensions: JPG, TIFF, BMP, PNG, RAW, or PDF. The term "digital image" also includes one or more images (e.g., frames) in a digital video.

As used herein, a "color theme" or "color palette" includes a set of colors that occur within a given image. In some embodiments, the color theme is represented by a "proportional color palette" that indicates some or all of the colors of an image's color theme as well as weights indicating respective prominence of the colors within the color palette (e.g., how much of the image includes content having a color associated with a particular color of the color theme). In some embodiments, the color theme of an image includes colors that are representative of several colors in the image. For example, in some embodiments, a color theme is determined by performing clustering on the colors included in an image. The resulting color theme then includes a representative color from each cluster.

As used herein, a "color theme variation" includes a new color theme that has been generated based on another color theme and which shares one or more colors from that color theme. As discussed further herein, in some embodiments, color theme variations are generated by a machine learning model that has been trained to learn to generate color themes. For example, the machine learning model is provided one or more colors and then outputs a new color theme (e.g., the color theme variation) that also includes those one or more colors.

As used herein, a "neural network" includes a machine-learning model that is tuned (e.g., trained) based on training input to approximate unknown functions. In particular, a neural network includes a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

As used herein, a "recolored output image" or "recolored image" includes an image whose color theme has been changed (e.g., recolored) from an original color theme to a new color theme. As discussed further herein, embodiments are usable with various recoloring techniques to recolor an image from its original color theme to one or more color theme variations.

FIG. 1 illustrates a diagram of a process of generating color theme variations in accordance with one or more embodiments. As shown in FIG. 1, recoloring system 100 receives an input image 102 at numeral 1. In various embodiments, recoloring system 100 includes a user interface manager 104 which presents a user interface to the user, such as a designer or other entity. For example, the user interacts with the user interface, via user interface manager 104, to provide input image 102 to recoloring system 100. As discussed further below, in some embodiments, the user interface includes a user interface element, such as a button, panel, menu, etc. which the user selects to select input image 102. In some embodiments, input image 102 is stored locally on the user's device (e.g., a desktop or laptop computer, mobile device, etc.) and the user selects input image 102 via a local file system. Alternatively, the input image is stored remotely, at a network-accessible location, in a cloud-based storage service, or other remote location. In such embodiments, the user accesses the remote location to obtain the input image and provides it to the recoloring system or provides a reference to the remote storage location (e.g., URL, URI) from which the recoloring system 100 obtains the input image.

Once the input image 102 is obtained by the recoloring system 100, it is provided to color extraction manager 106. At numeral 2, color extraction manager 106 determines a color theme associated with the input image. In some embodiments, color extraction manager 106 identifies the unique colors in the input image 102 and groups them. The color extraction manager 106 also determines weights associated with the colors indicating how prevalent each color (or group of colors) is in the input image. In some embodiments, the color extraction manager 106 computes a color histogram of input image. If the input image 102 is a raster image, this is determined using k-means clustering into a suitable number of clusters. If the input is a vector image, then the color extraction manager 106 enumerates all the colors in the image and also computes a number of pixels for each color. The weight of each color is determined by normalizing the number of pixels of each color. In some embodiments, the weights are used to generate a proportional color palette that represents the color theme of the input image. Once the color theme has been identified for the input image, the color extraction manager 106 randomly samples a portion of the colors. In some embodiments, between 20% and 40% of the colors in the color theme are sampled. For example, if the color theme includes ten colors, then in such embodiments two to four colors are sampled. However, in some embodiments, more or fewer colors, up to the total number of colors in the color theme are sampled. These sampled colors are used as priors during further processing.

At numeral 3, the sampled colors are provided to color distribution modeling network 108. Color distribution modeling network 108 is a neural network that has been trained to generate a new color distribution (e.g., a new color theme). A neural network includes a machine-learning model that is tuned (e.g., trained) based on training input to approximate unknown functions. In particular, a neural network includes a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

At numeral 4, the sampled colors are used as priors for inference by the color distribution modeling network 108 to generate a new color distribution. The maximum number of colors in this new distribution is specified during the training phase of the color distribution modeling network 108. For each prior, the color distribution modeling network 108 generates multiple color distributions and since these are generated by sampling a probability distribution function, there is appropriate variability between the generated distributions. For example, the color values of the color priors (e.g., HSV, RGB, or other color representations), along with corresponding weights, are provided to the color distribution modeling network 108. In some embodiments, the color distribution modeling network 108 is an autoregressive model that, given a set of inputs, predicts the next value in the series. For example, if the input is a single color and weight, then the input includes hue, saturation, value, and weight values for color 1 (e.g., $H_1 S_1 V_1 W_1$). The color distribution modeling network 108 then predicts the hue value for color 2 (e.g., $H_2$). The next input to the color distribution modeling network 108 is the $H_1 S_1 V_1 W_1 H_2$ and the network predicts $S_2$, and so on until the values of the rest of the colors of the new distribution have been predicted.

Once a set of new color distributions have been created, they are provided to color theme evaluation network 110, at numeral 5. Because color distribution modeling network 108 is generating new color distributions based on a probability distribution, the resulting new color themes are not necessarily aesthetically pleasing. As such, color theme evaluation network is responsible for scoring each color theme based on how similar each new color theme is to the color themes that were used to train the color theme evaluation network 110. At numeral 6, the color theme evaluation network 110 determines a score for each new color theme. These distributions are then sorted based on this score, and the top distributions are used for generating color variations. For example, in some embodiments, the top X distributions are used for generating color variations, where X is an integer set by the user, a default value, etc. Alternatively, any distribution with a score greater than a threshold value is used for generating color variations.

At numeral 7, the top distributions are provided to recolor manager 112. Recolor manager 112 then performs color transfer on the original input image using each new color theme, at numeral 8, resulting in a number of recolored images equal to the number of top distributions identified. At numeral 9, the recolored images 114 are presented to the user via user interface manager 104. For example, in some embodiments, the original image is displayed along with one or more of the recolored images 114 in the user interface. In some embodiments, a sidebar, panel, or other UI element is displayed which enables the user to navigate among the different recolored images 114. In some embodiments, when a recolored image is selected by the user, the user is then enabled to modify the color theme (e.g., change proportions, change colors, etc.) and the image is updated accordingly by recolor manager 112.

Figure 2:
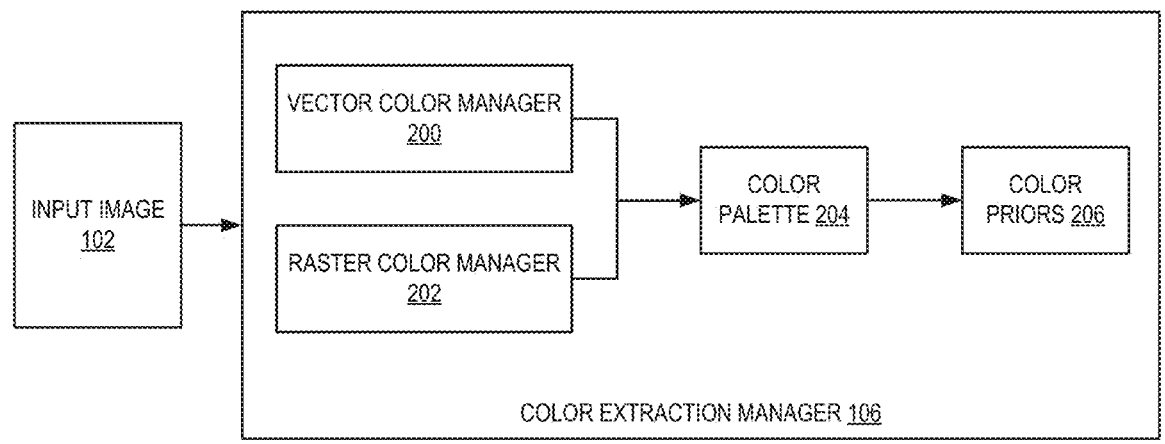
FIG. 2 illustrates a diagram of a color extraction manager in accordance with one or more embodiments.

FIG. 2 illustrates a diagram of a color extraction manager in accordance with one or more embodiments. As discussed, when an input image 102 is received, it is first processed by color extraction manager 106. Color extraction manager 106 is operable to determine a color histogram for both raster images and vector images. For example, color extraction manager 106 includes vector color manager 200 and raster color manager 202 for processing raster input images and vector input images, respectively.

When a vector image is received, vector color manager 200 determines a color palette 204 for the image using a clustering process. The vector color manager 200 identifies color information for each pixel in the vector image. The vector color manager 200 quantizes the pixels into bins based on the color information. This quantization, in some cases, allows for improved processing speeds (e.g., within milliseconds), thereby providing a more responsive and intuitive workflow. The quantized color values are then grouped into color clusters. For instance, the vector color manager 200 performs k-means clustering on the binned color values. In some embodiments, the vector color manager 200 selects a value of k (i.e., the number of centroids in the k-means clustering) that is equal to the number of discrete colors identified for a target graphic.

The colors of the input image's color palette are then computed from the color clusters, where each color from the source color palette corresponds to a respective color cluster. For instance, the raster color manager 202 selects a color at a cluster center (e.g., the color space values from the vector identifying the location of the cluster center) as one of the palette colors in the source color palette.

In some embodiments, weights for the color palette of the input image are computed based on the respective numbers of pixels in the color clusters. For instance, the vector color manager 200 identifies, for a given palette color, the cluster from which the palette color was determined. The vector color manager 200 identifies the number of pixels assigned to the cluster. The vector color manager 200 determines the total pixel coverage of the input image 102 (i.e., the total number of pixels used to render the raster image). The vector color manager 200 computes a weight for the given palette color by, for example, normalizing the respective number of pixels associated with the palette color with respect to the total pixel coverage of the input image. For instance, the normalization could involve dividing the number of pixels associated with the palette color by the total number of pixels used to render the input image, where the number of pixels associated with the palette color is the number of pixels assigned to the cluster from which the palette color was determined.

When a raster input image is received, raster color manager 202 is responsible for generating its corresponding color palette 204. For example, pixels of the raster graphic are quantized into bins. The raster color manager 202 applies k-means clustering to the bins and thereby identifies palette colors from the input image 102. In particular, the raster color manager 202 uses, as the palette colors, the centers of clusters obtained from the convergence of the k-means clustering. The number of pixels assigned to a given cluster is used to compute a weight for a target palette color (i.e., the color defined by the point at the cluster center). For instance, a number of pixels assigned to a cluster is normalized by dividing the number of pixels by the total number of pixels in the raster target graphic.

Once the color palette 204 for input image 102 has been obtained, the color palette 204 is sampled to obtain color priors 206. In some embodiments, 20%-40% of the colors from the color palette are randomly selected. For example, if the input image 102 was determined to have ten color clusters, then its color palette includes the ten colors representing the centroids, or medoids, of those clusters. Between two and four, inclusive, of these colors would then be randomly selected as color priors 206. Alternatively, color priors are selectable in different ways. For example, in some embodiments, the user selects color priors from the color palette, or the highest weighted colors from the color palette are selected as priors, etc.

Figure 3:
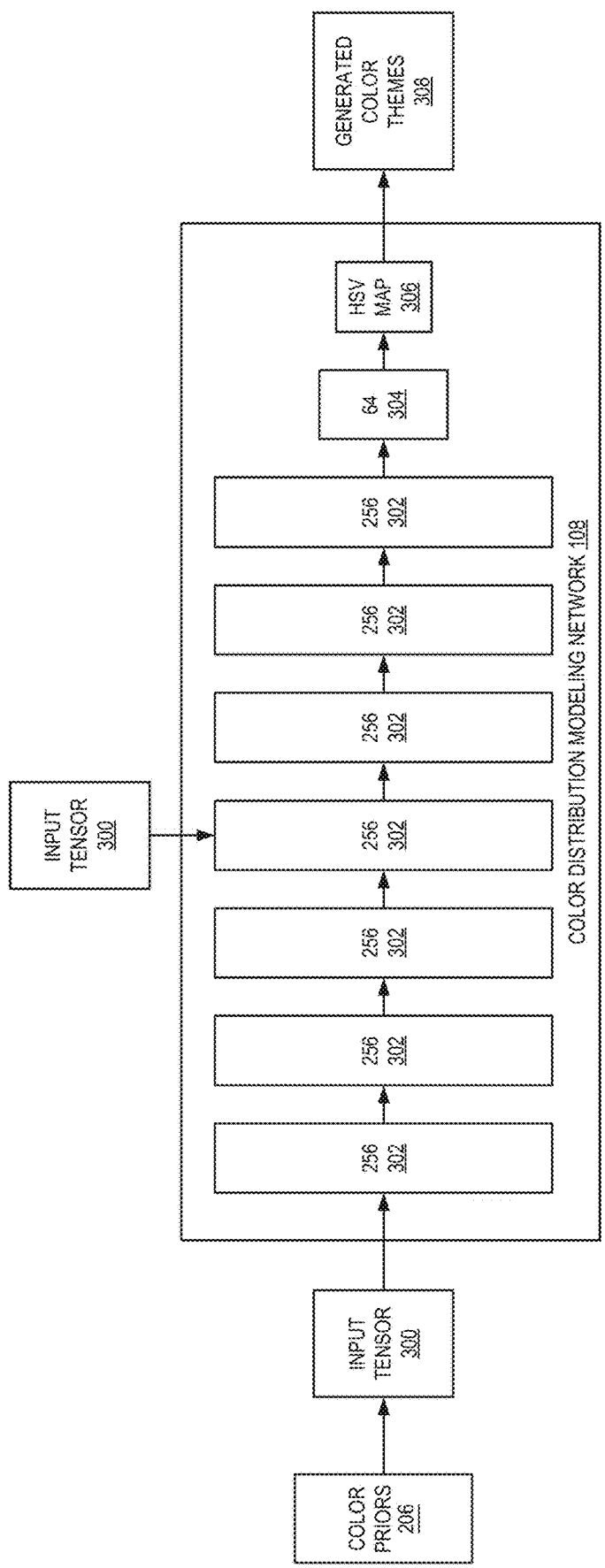
FIG. 3 illustrates a diagram of a color distribution modeling network in accordance with one or more embodiments.

FIG. 3 illustrates a diagram of a color distribution modeling network in accordance with one or more embodiments. The goal of the color distribution modeling network is to model the color distribution of a collection of color themes. Embodiments model the color distribution as a flat list of floating-point values. Each color in the distribution is represented as three hue-saturation-value (HSV) color channels and the relative weight of this color in the distribution. As such, a palette with P colors has 4P floats. Each float is remapped to the −1 to 1 range. The palette is modeled sample-by-sample by color distribution modeling network 108. The color distribution modeling network 108 predicts the K+1 float as a discrete probability distribution over 64 uniformly spaced buckets in the −1 to 1 normalized range. Predicting a probability distribution over uniformly spaced buckets (as compared to predicting a single float channel value) improves the learning process, and also ensures variability in the predicted output during inferencing. This distribution is then sampled to produce the K+1 weighted palette value, which is then appended to the input floats. By repeating this process, a new color distribution is sampled.

As shown in FIG. 3, the network architecture takes as input a tensor of at most K−1 floats representing the color priors 206. In some embodiments, the input tensor 300 is padded with sentinel padding values of 0 so that the tensor is always of size exactly K−1. Next, each input element is independently encoded into a feature vector. For example, one feature channel is for padding, that is '1' if and only if this is a padding element. The four feature channels, one each for Hue, Saturation, Value and Weight are encoded with a component type. The component type is '1' if and only if this element represents an entry of the corresponding type. Additionally, a positional encoding function is used to amplify the input float with a frequency basis. This produces 2 L features from the input float.

Using this method, the input tensor is encoded into a tensor of size (K−1)×(3+2 L). This encoded tensor is then flattened and fed into a fully connected color distribution modeling network 108. In the example of FIG. 3, the color distribution modeling network 108 includes six fully connected linear layers 302 each with 256 channels and with the ELU activation function for non-linearity. After the third linear layer, the flattened encoded input tensor is concatenated. The final output layer 304 has 64 channels, which is followed by a SoftMax operation to model the target probability distribution to HSV values, shown by HSV map 306.

In some embodiments, the color distribution modeling network 108 is autoregressive and predicts the next value in the distribution each time it performs inference. For example, if there are two color priors, each represented by four floats (e.g., $H_1 S_1 V_1 W_1$ and $H_2 S_2 V_2 W_2$), then the color distribution modeling network 108 next predicts $H_3$.

This is then added to the input and encoded into a new input tensor that represents $H_1 S_1 V_1 W_1$, $H_2 S_2 V_2 W_2$, $H_3$, and the color distribution modeling network 108 performs inference again to predict $S_3$, which is then added to the input again, and so on until the entire new color theme has been generated. This process is performed repeatedly, starting with the same color priors 206, until multiple new generated color themes 308 have been generated by color distribution modeling network 108.

Figure 4:
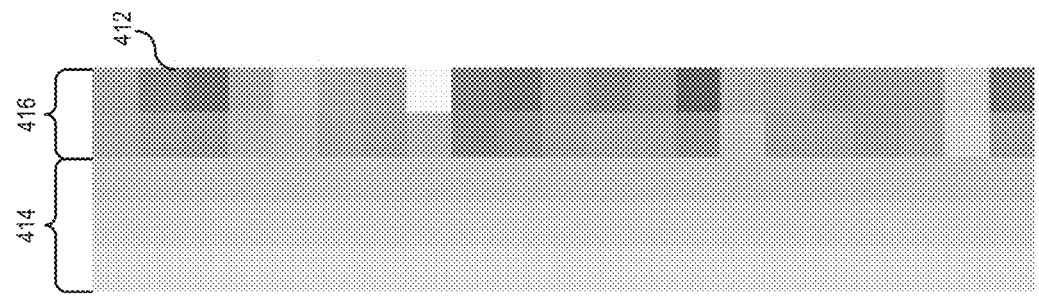
FIG. 4 illustrates examples of generated color themes in accordance with one or more embodiments.
Figure 4:
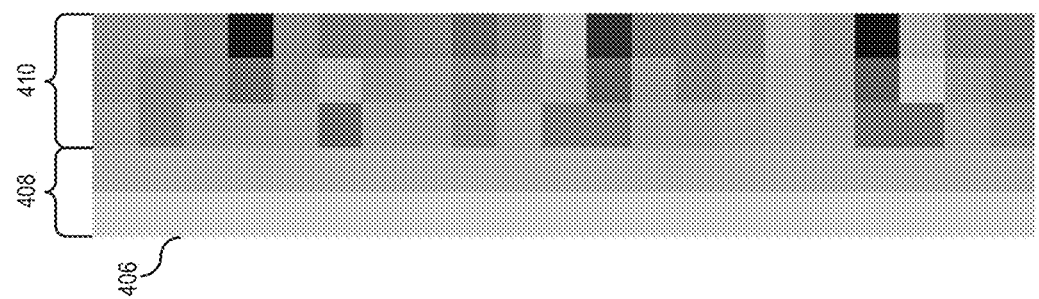
Figure 4:
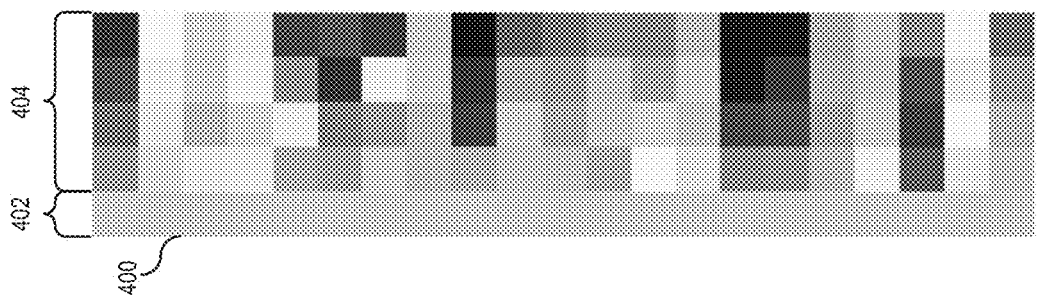

FIG. 4 illustrates examples of generated color themes in accordance with one or more embodiments. FIG. 4 is a visualization of predicted color theme results by color distribution modeling network 108 using different color priors. For example, distributions 400 include a single color prior 402, distributions 406 include two color priors 408, and distributions 412 include three color priors 414. In each distribution 400, 406, 412, each row represents a different predicted color theme.

For example, in distributions 400, color prior 402 is encoded into an input tensor, as described above, and provided to color distribution modeling network 108. The color distribution modeling network 108 is then repeatedly run to predict the color and weight values (e.g., HSVW, described above), based on the color prior. Each time the color distribution modeling network 108 is run, it predicts the next value following the inputs it received. For example, if the input is $H_1S_1V_1W_1$, $H_2S_2V_2W_2$, $H_3$, then the color distribution modeling network 108 next predicts $S_3$, etc. The color distribution modeling network 108 is run repeatedly until each subsequent color and weight has been predicted in each distribution. Similarly, in distributions 406, two color priors are provided and the color distribution modeling network 108 predicts the remaining three colors and weights 410 of each color theme. In distributions 412, three color priors 414 are provided, and the color distribution modeling network 108 is then run to predict the remaining two colors and weights 416 of each color theme. Although the example of FIG. 4 shows color themes having five colors each, in various embodiments the color distribution modeling network 108 is used to predict larger or smaller color themes (e.g., having more or fewer colors)

Figure 5:
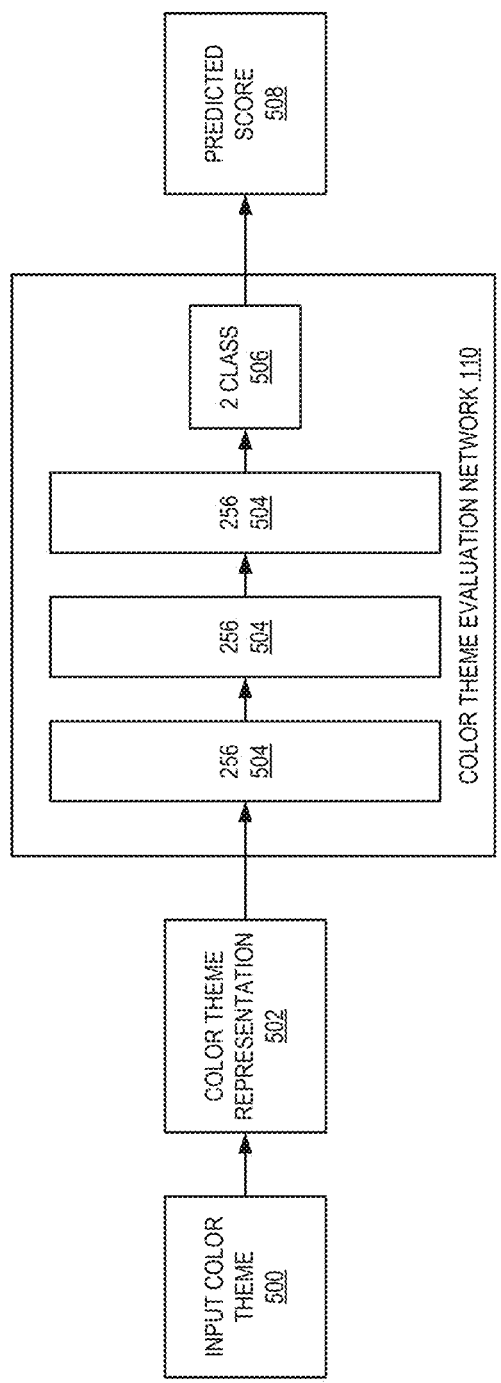
FIG. 5 illustrates a diagram of a color theme evaluation network in accordance with one or more embodiments.

FIG. 5 illustrates a diagram of a color theme evaluation network in accordance with one or more embodiments. As discussed, the color distribution modeling network 108 generates multiple color themes based on one or more color priors. While the quality of these generated color themes is targeted to draw from the distribution of "high quality" palettes in the training distribution, it is useful to rank the generated palettes according to their quality. While it is possible to directly use the product of the likelihoods from the color distribution modeling network, it was found to be more effective to instead train a separate, specialized network that attempts to directly estimate how likely this palette is to be from the original high quality palette dataset. Accordingly, color theme evaluation network 110 is responsible for scoring the color themes generated by the color distribution modeling network 108 such that the best color themes are selected for recoloring the input image. In this example, the "best" (e.g., highest scoring) color themes are those that most closely resemble color themes that were included in the training dataset.

Because there are only a few thousand color themes in the training dataset, a direct network that classifies "training palette" vs. "not training palette" will be able to overfit easily. Instead, the color theme evaluation network is trained that takes any ordered subset of the input palette as training set. For example, every pair of colors, every triplet of colors, and so on, up to the entire palette (e.g., theme). The color theme evaluation network then predicts whether any given subset of colors of an input color theme 500 is from the training palettes or not from the training palettes.

In some embodiments. the color theme evaluation network 110 operates on a maximum of C colors with 3 color channels each. Each color of the input color theme is converted into the HSV color space and each channel is normalized to (−1, 1). Given a subset of length S colors ($S_i$=C), then C "indicator/mask" variables are created that are 1 if this color is part of the subset or 0 if not. All color subsets are left-aligned, so this vector includes S 1s and (C−S) 0s. The remaining variables are 3*C color channel values, which are the HSV values for the selected colors. For the (C−S) masked/inactive colors, the sentinel value of 0 is used for each channel.

The input C indicator variables and 3*C color channel variables are concatenated to form color theme representation 502, and then fed through three fully connected layers 504 with 256 channels each and ELU activation. The final layer is a simple 2-class fully connected layer 506 that are the classification logits for the two classes predicted by the color theme evaluation network that indicate whether the given color subset comes from a training palette or not. The predicted score 508 for each input color theme is a combination of the scores for each subset of the input color theme. For example, in some embodiments, the scores of the subsets are averaged to generate the predicted score 508 for the input color theme 500.

Figure 6:
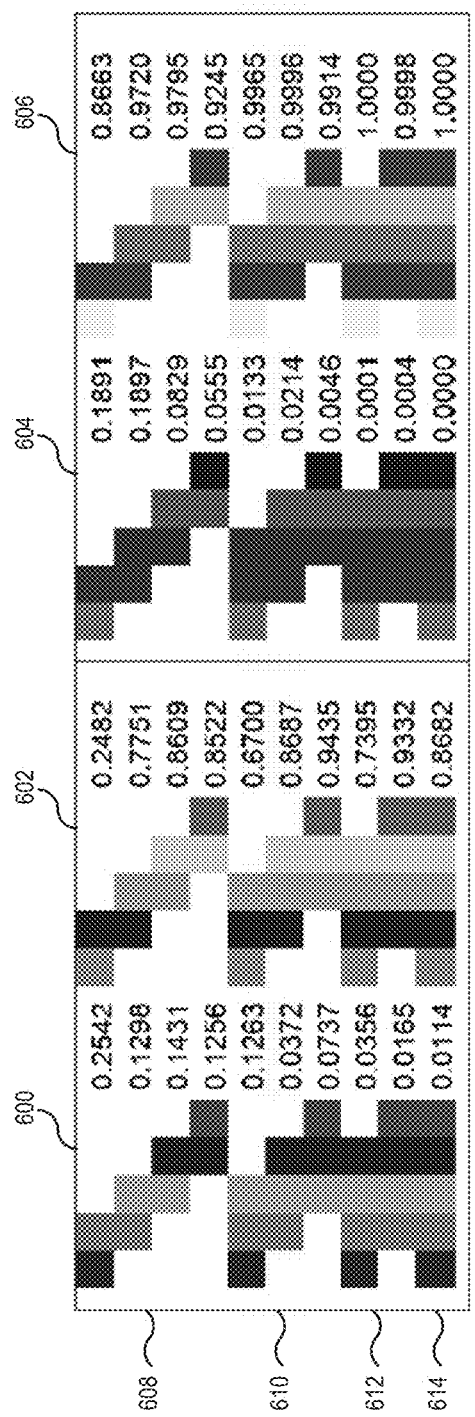
FIG. 6 illustrates examples of predicted scores for generated color themes in accordance with one or more embodiments.

FIG. 6 illustrates examples of predicted scores for generated color themes in accordance with one or more embodiments. As shown in FIG. 6, four color themes 600-606 are scored by color theme evaluation network 110. Subsets of each color theme are individually scored. For example, as shown at 608, each pair of colors of each theme is scored. Then each trio of colors of each theme is scored as shown at 610. Similarly, each subset of four colors is scored at 612, and the entire color theme is scored at 614. In this example, the highest score is 1 and the lowest score is 0. In some embodiments, the score for a given color theme is an average of the scores generated for each subset of the color theme. As discussed, the generated color themes are then ranked according to their scores. Although the example of FIG. 6 shows color themes that include five total colors, in various embodiments the color themes include any number of colors.

Figure 7:
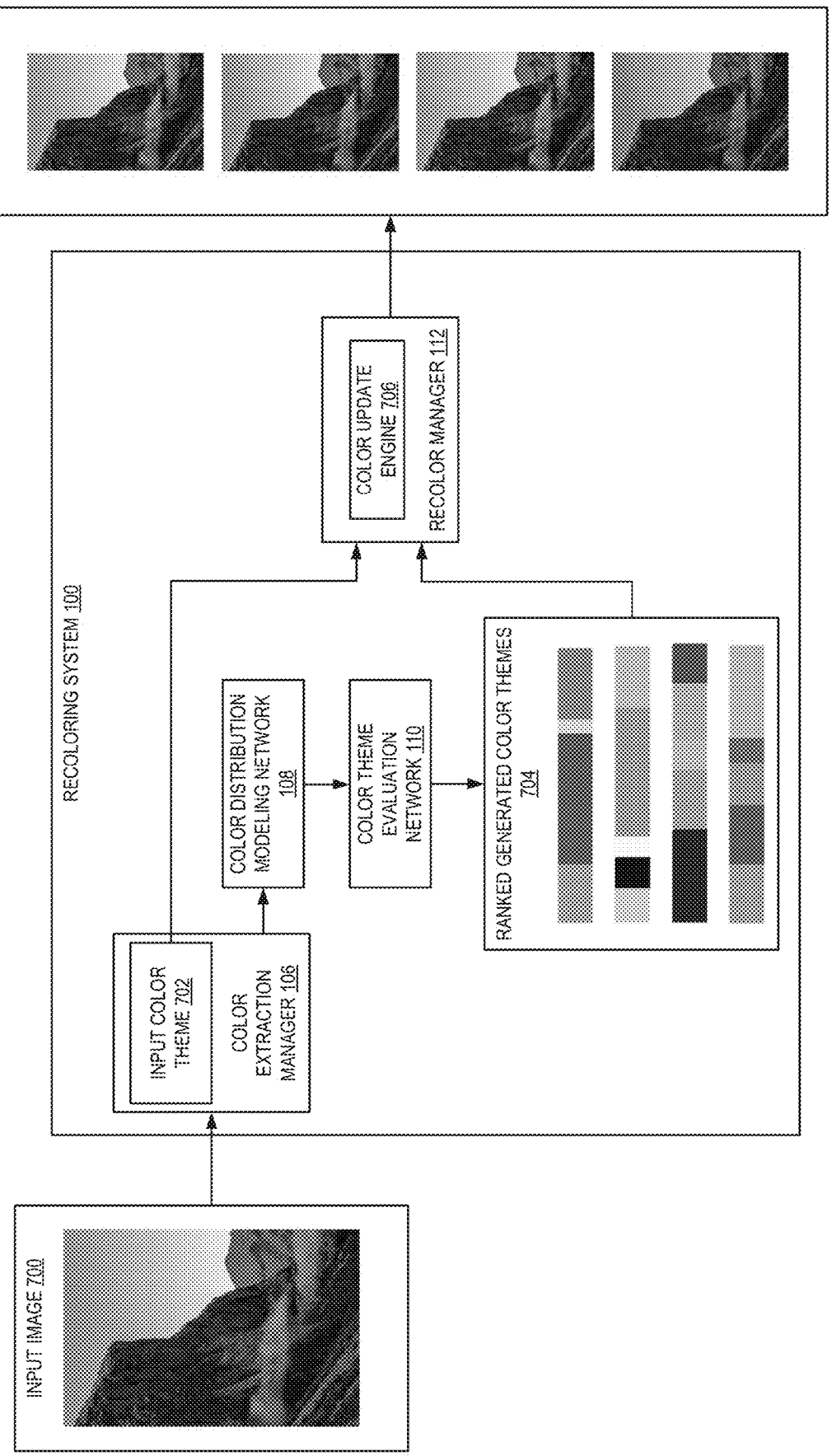
FIG. 7 illustrates a diagram of a recoloring system in accordance with one or more embodiments.

FIG. 7 illustrates a diagram of a recoloring system in accordance with one or more embodiments. As shown in FIG. 7, an input image is received by recoloring system 100. The input image 700 is received by color extraction manager 106. As discussed above, the color extraction manager 106 determines an input color theme 702 for the input image. Additionally, the color extraction manager 106 determines one or more color priors by sampling the input color theme 702 and provides the priors to color distribution modeling network 108. Color distribution modeling network 108 then generates a plurality of generated color themes based on the priors. The generated color themes are then provided to color theme evaluation network 110 which scores the generated color themes. The generated color themes are then ranked, as shown at 704. In the example of FIG. 7, each ranked color theme is shown represented by its corresponding proportional color palette.

In some embodiments, the recolor manager 112 obtains the input color theme 702 and a color theme from the ranked generated color themes 704 and provides them to color update engine 706 to compute a palette flow that maps colors of the input color theme 702 to colors of the ranked generated color theme. For instance, the color update engine 706 determines parameters of a transfer function that maps a distribution of colors in the output graphic to a distribution of colors in the input graphic.

In some embodiments, a palette flow includes flows that are computed based on an amount of work required to transform a color distribution of the input color theme 702 into a source color distribution of the ranked generated color theme 704. For instance, computing the palette flow could involve minimizing an earth-mover distance between a color distribution of the input color theme 702 and a color distribution of the ranked generated color theme 704. Computing an earth-mover distance involves computing the amount of work required to change the input color distribution into the output color distribution. For instance, the work contributed to the earth-mover distance by an input color and an output color is modeled as a movement of a certain amount of mass along a distance between a first point in a color space, such as a first set of L*a*b* color space values defining an input color, and a second point in the color space, such as a second set of L*a*b* color space values defining an output color. In this scenario, the modeled "mass" is referred to as a "flow" between the input color, which is defined by the first set of L*a*b* color space values, and the output color, which is defined by the second set of L*a*b* color space values.

A palette flow includes a set of these flows that are computed using the earthmover distance. Certain flows between a given input color and multiple output colors are used to compute a weighted combination of the output colors that are usable to replace the input color. Using the earth-mover distance, in some cases, results in improved coherence being maintained after a color transfer, and also adds robustness in cases where there is a large difference between the distribution of colors within the output graphic color distribution and the distribution of colors within the input graphic. Thus, certain embodiments using this type of flow computation generate recolored vector graphics that have a high aesthetic quality.

In one example, the color update engine 706 minimizes an earth-mover distance subject to one or more constraints. Examples of these constraints include requiring a sum of flows for a color in the input color theme 702 to be less than or equal to a weight of the color in the input color distribution, requiring a sum of flows for an output color in the ranked generated color theme 704 to be less than or equal to a weight of the output color in the output color distribution, or some combination thereof.

Additionally, or alternatively, in some embodiments, minimizing the earth-mover distance involves minimizing an objective function. For example, each color palette used includes a set of colors that occur within the graphic, along with weights indicating respective proportions of the colors within the color palette (e.g., how much of the graphic includes content having a particular color). The color update engine 706 computes a total weight that is a sum of weights of the colors in the input color theme 702. The color update engine 706 also computes a total weight that is a sum of weights of the colors in the ranked generated color theme 704. The color update engine 706 selects a total flow constraint that is a minimum of the total target weight and the total source weight.

Continuing with this example, color update engine 706 accesses, from a non-transitory computer-readable medium used by the color update engine 706, an objective function. The objective function could include a weighted summation of distances with respect to the colors of the input color theme 702 and the colors of the ranked generated color theme 704, where the distances are weighed by flows with respect to the colors of the input color theme 702 and the colors of the ranked generated color theme 704. For instance, each term of the weighted summation could include a distance that is weighted with a flow, where the distance is a distance between a pair of colors from the input color theme 702 and the ranked generated color theme 704 and the flow is a flow between that pair of colors.

In this example, the color update engine 706 determines, subject to a set of constraints, the flows that minimize the objective function. In some embodiments, the set of constraints includes the sum of flows for the color in the input color theme 702 being less than or equal to the weight of the color in the input color distribution. In some embodiments, the set of constraints also includes the sum of flows for the color in the ranked generated color theme 704 being less than or equal to the weight of the color in the output color distribution. In some embodiments, the set of constraints also includes the sum of the flows with respect to the colors of the input color theme 702 and the colors of the ranked generated color theme 704 being equal to the total flow constraint.

In one example of the embodiment discussed above, $C_T$ and $C_I$ are weighted color distributions of the input graphic (also referred to as a target graphic) and the updated input color theme (also referred to as a source color palette), respectively. In this example, $C_T$ has m colors with $C_T=(C_{T1}; w_{C_{T1}}), (C_{T2}; w_{C_{T2}}), \ldots (C_{Tm}; w_{C_{Tm}})$, where $C_{Ti}$ is the ith color and $w_{C_{Ti}}$ is the weight of the ith color. Similarly, $C_I$ has n colors with $C_I=(C_{I1}; w_{C_{I1}}), (C_{I2}; w_{C_{I2}}), \ldots (C_{In}; w_{C_{In}})$, where $C_{Ij}$ is the jth color and $w_{C_{Ij}}$ is the weight of the jth color. (In some embodiments, m=n, but this example is applicable for any values of m, n>0.) The ground distance between $C_T$ and $C_I$ is $D=[d_{C_{Ti},C_{Ij}}]$. The color update engine 706 computes a palette flow $F=[f_{i,j}]$, where $f_{i,j}$ is a flow between target color $C_{Ti}$ and source color $C_{Ij}$.

Continuing with this example, the color update engine 706 computes a palette flow that minimizes a cost. For instance, the color update engine 706 accesses an objective function:

$$\sum_{i=1}^{m}\sum_{j=1}^{n} f_{C_{Ti},C_{Ij}} d_{C_{Ti},C_{Ij}}$$

The color update engine 706 computes flows (i.e., $f_{C_{Ti}}, C_{Ij}$ for i=1 . . . m and j=1 . . . n) that minimize this objective function subject to a set of constraints. One of these constraints is represented by the following formula:

$$f_{C_{Ti},C_{Ij}} \geq 0, 1 \leq i \leq m, 1 \leq j \leq n$$

This constraint requires each flow from a target color to a source color to have a value greater than 0. Another one of these constraints is represented by the following formula:

$$\sum_{j=1}^{n} f_{C_{Ti},C_{Ij}} \leq w_{C_{Ti}}, 1 \leq i \leq m$$

This constraint requires that a sum of flows for a given target color i to be less than a weight for that target color i. Another one of these constraints is represented by the following formula:

$$\sum_{i=1}^{m} f_{C_{Ti},C_{Ij}} \leq w_{C_{Ij}}, 1 \leq j \leq n$$

This constraint requires that a sum of flows for a given source color j to be less than a weight for that source color j. Another one of these constraints is represented by the following formula:

$$\sum_{i=1}^{m}\sum_{j=1}^{n} f_{C_{Ti},C_{Ij}} = \min\left\{\sum_{i=1}^{m} w_{C_{Ti}}, \sum_{j=1}^{n} w_{Ij}\right\}$$

This total flow constraint requires that the sum of all of the flows must be equal to a minimum of a total target weight and a total source weight, where a total target weight $\sum_{i=1}^{m} w_{C_{Ti}}$ is a sum of the weights of the colors in the input color theme and a total source weight $\sum_{j=1}^{n} w_I w_{Ij}$ is a sum of the weights of the colors in the updated dominant color palette.

In this example, a palette flow F is computed by solving this linear optimization problem. The earth-mover distance is defined as the work normalized by the total flow, as represented in the following formula:

$$EMD(P, Q) = \frac{\sum_{i=1}^{m} \sum_{j=1}^{n} f_{C_{Ti},C_{Ij}} d_{C_{Ti},C_{Ij}}}{\sum_{i=1}^{m} \sum_{j=1}^{n} f_{C_{Ti},C_{Ij}}}$$

In some embodiments, solving the linear optimization problem involves computing one or more sets of flows between the colors of the updated dominant color palette and one or more target color of the input color theme that minimize the earth-mover distance. For instance, for a given color i in the color palette of the input vector graphic, a set of flows is found between each color j in the updated dominant color palette that causes the earth-mover distance to be minimized. The set of flows allows for recoloring objects of the output vector graphic using color information from the updated dominant color palette, as described further below.

An illustrative example of a palette flow is provided in Table 1 below. In this simplified example, an updated dominant color palette has three output palette colors, and an input color theme of an input vector graphic has three input palette colors. In this example, the palette flow is a data structure in which a record for a given color from a target palette identifies the set flows between that target color and the various updated dominant color palettes. For instance, a record for a first color (identified as "input palette color 1" in the example of Table 1) would include data (e.g., columns or other fields) identifying a flow of $f_{1,1}$ between the first input color and the first output color, a flow of $f_{1,2}$ between the first input color and the second output color, and a flow of $f_{1,3}$ between the first input color and the third output color.

TABLE 1

Palette flow example

|  | Output Palette Color 1 | Output Palette Color 2 | Output Palette Color 3 |
| --- | --- | --- | --- |
| Input Palette Color 1 | $f_{1,1}$ | $f_{1,2}$ | $f_{1,3}$ |
| Input Palette Color 2 | $f_{2,1}$ | $f_{2,2}$ | $f_{2,3}$ |
| Input Palette Color 3 | $f_{3,1}$ | $f_{3,2}$ | $f_{3,3}$ |

In some embodiments, after obtaining the palette flow using earth-mover distance, the color update engine 706 attempts to harmonize the colors. In some embodiments, this is performed using the luminance value or without the luminance value. An example of such harmonization is found in Chang et al., "Palette-based Photo Recoloring," ACM Transactions on Graphics, 2015.

In some embodiments, the input color information included in the input graphic color information is mapped to the ranked generated color theme using a palette flow. For instance, the color update engine 706 maps a color from the input color theme 702 to a color of the updated dominant color palette 610. In examples involving paths with constant colors, the particular color and the corresponding color within the input color theme could be the same. In examples involving a palette color determined from a clustering process, the color update engine 706 identifies which color within the input color theme was determined from the cluster to which the particular color was assigned.

In examples involving the minimization of an earth-mover distance, the color from the input graphic is mapped to a modified color that is a weighted combination of colors from the updated dominant color palette. The weights in this weighted combination are the set of flows between the colors of the updated dominant color palette and the color from the input graphic that cause the earth-mover distance to be minimized. An example of a formula representing this operation is provided below.

$$C'_{Ti} = \frac{\sum_{j=1}^{n} f_{C_{Ti},C_{Ij}} \times C_{Ij}}{\sum_{j=1}^{n} f_{C_{Ti},C_{Ij}}}$$

In this formula, a modified color $C'_{Ti}$ is computed from a set of flows $f_{C_{Ti},C_{Ij}}$ between input color $C_{Ti}$ and an output color $C_{Ij}$. The summation of multiplying these flows by the output color $C_{Ij}$ is normalized with respect to the summation of these flows. For instance, in the example above, the term $\Sigma_{j=1}^{n} f_{C_{Ti},C_{Ij}} \times C_{Ij}$ is divided by the term $\Sigma_{j=1}^{n} f_{C_{Ti},C_{Ij}}$.

The colors of the input graphic are then modified by changing the input color information to using the output color information. For instance, the color update engine 706 modifies a digital file including the input graphic to include updated color information. Examples of this modification include modifying color information for pixels of a target graphic that is a raster graphic, modifying the values of one or more color parameters of a target graphic that is a vector graphic, or some combination thereof. In some embodiments, performing a modification to the input graphic involves modifying a copy of the input graphic used in a preview function of a digital design system. In additional or alternative embodiments, performing a modification to the input graphic involves creating a modified input graphic that is outputted by the recoloring system 1200.

In various embodiments, recolor manager 112 and color update engine 706 generate a plurality of recolored output images 708 using the above-described process. Alternatively, different recoloring processes are used to recolor the input image to each of a plurality of ranked generated color themes. Once the recolored output images 708 have been generated they are presented to the user via a user interface for review.

Figure 8:
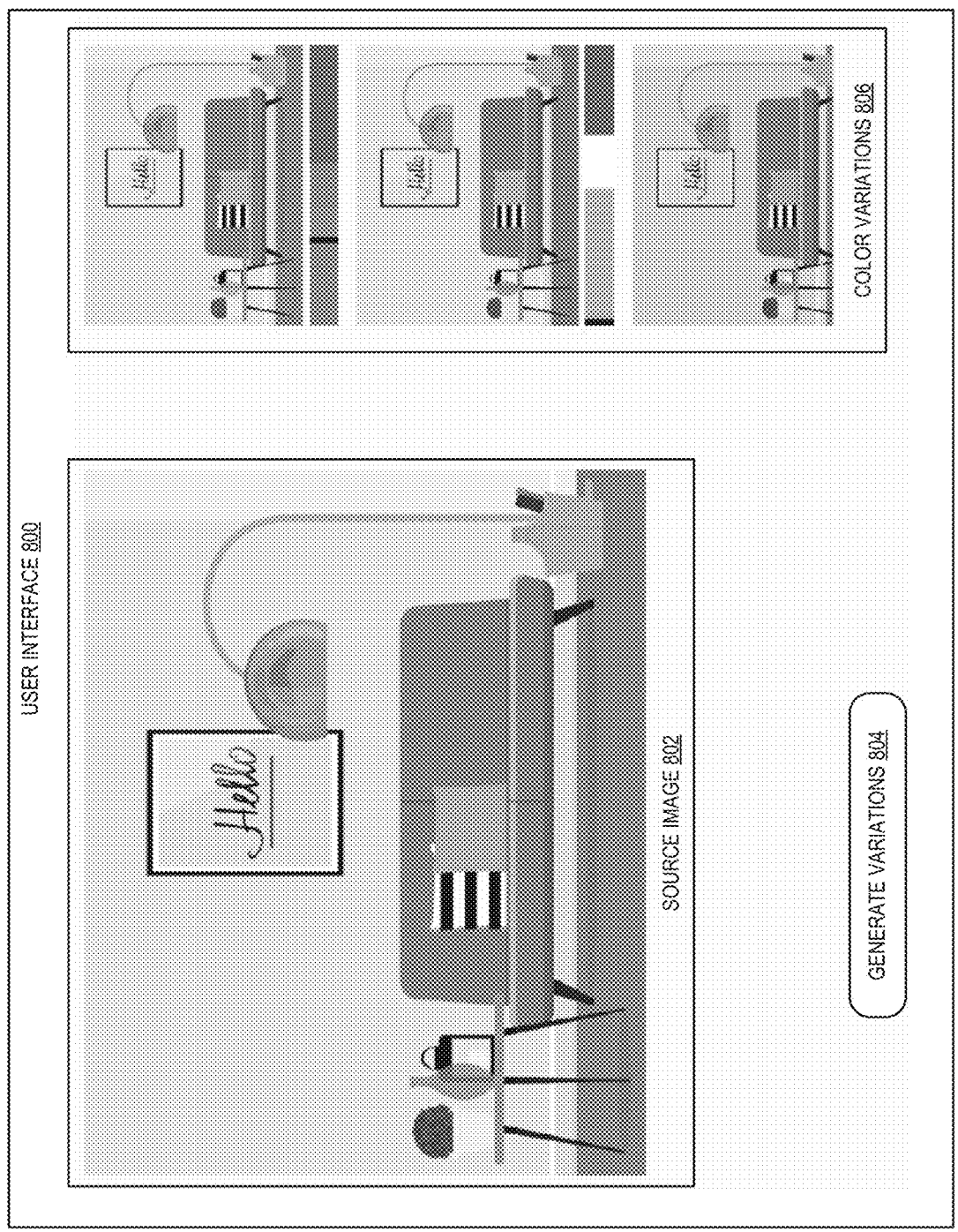
FIGS. 8-11 illustrate example user interfaces in accordance with one or more embodiments.

FIGS. 8-11 illustrate example user interfaces in accordance with one or more embodiments. As shown in FIG. 8, a user interface 800 is presented to the user to generate multiple color variations of an input image using the techniques described herein. In some embodiments, user interface 800 is presented as part of a standalone application, such as a color variations application. Additionally, or alternatively, user interface 800 is presented as part of a digital design application, such as Adobe Illustrator, Adobe Photoshop, a suite of applications such as Adobe Creative Cloud, etc. In some embodiments, user interface 800 is provided as part of a web application. In such embodiments, the user interface 800 is presented via a web browser.

In the example of FIG. 8, the user selects a source image 802 which is then displayed in the user interface 800. The source image 802 is selectable via a local file system, remote storage location, cloud storage provider, or other image source. The user then selects generate variations icon 804. Once selected, the source image 802 is provided to a recoloring system, such as recoloring system 100 described above, to generate multiple color variations 806. As discussed above, the variations are generated using two neural networks, a first to generate multiple color themes based on the colors of the source image 802, and a second to rank the generated color themes. The top ranked generated color themes are then used to generate multiple recolored output images that are presented via the user interface 800 as color variations 806. Although three variations are shown in the example of FIG. 8, in various embodiments the user interface displays more or fewer variations. For example, in some embodiments, color variations 806 are shown in a UI element that enables the user to scroll through multiple variations.

Figure 9:
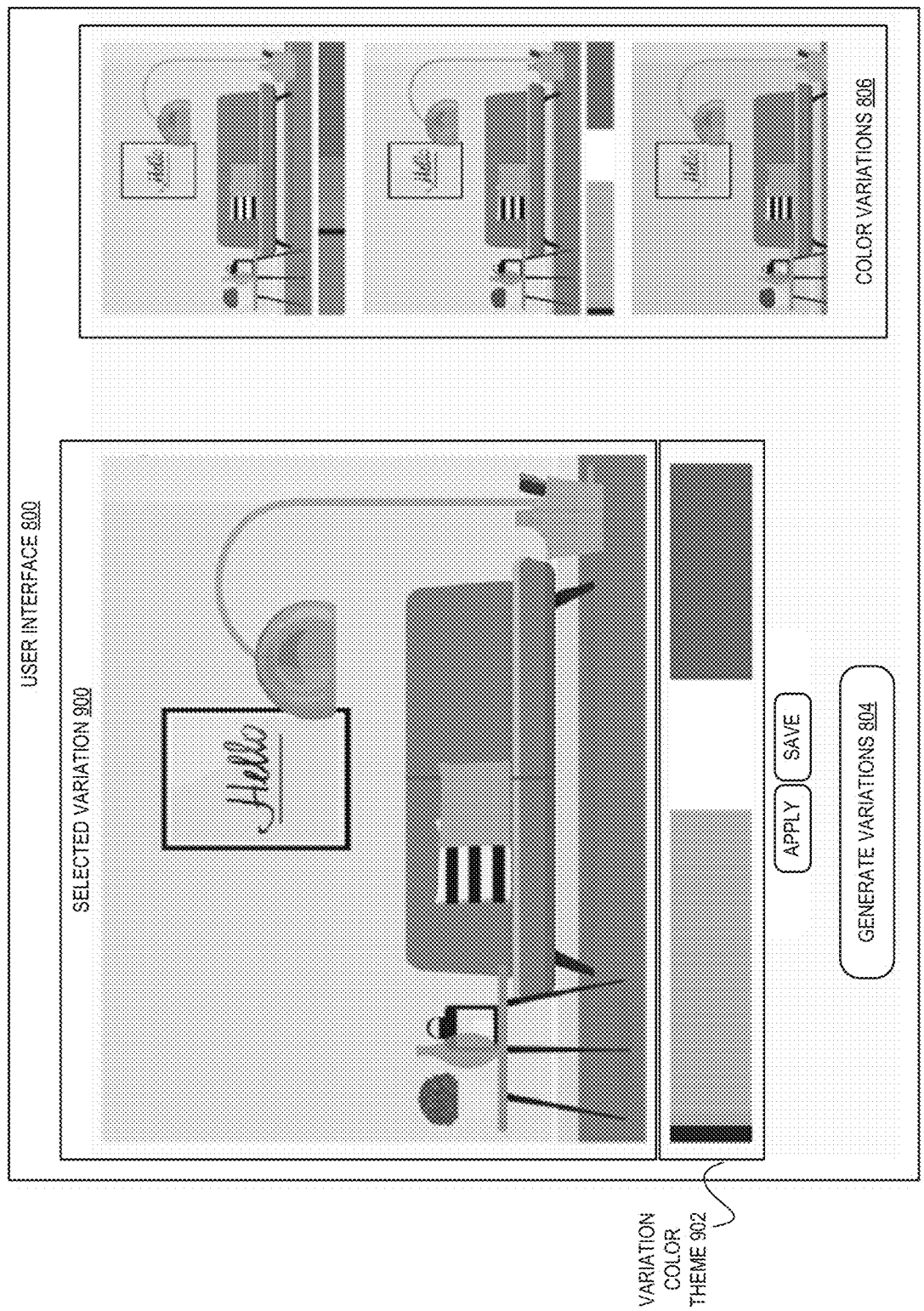
Figure 10:
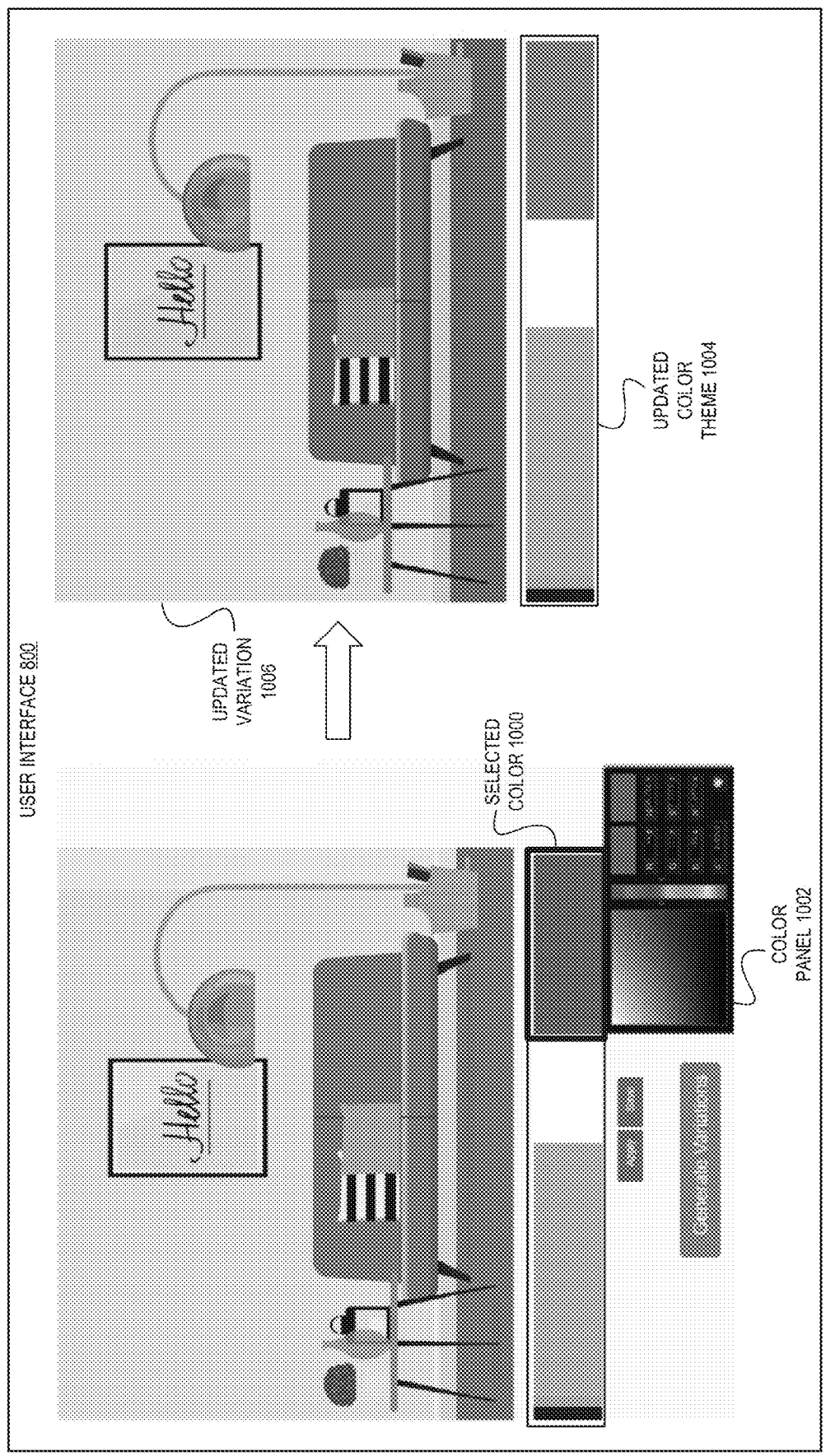
Figure 11:
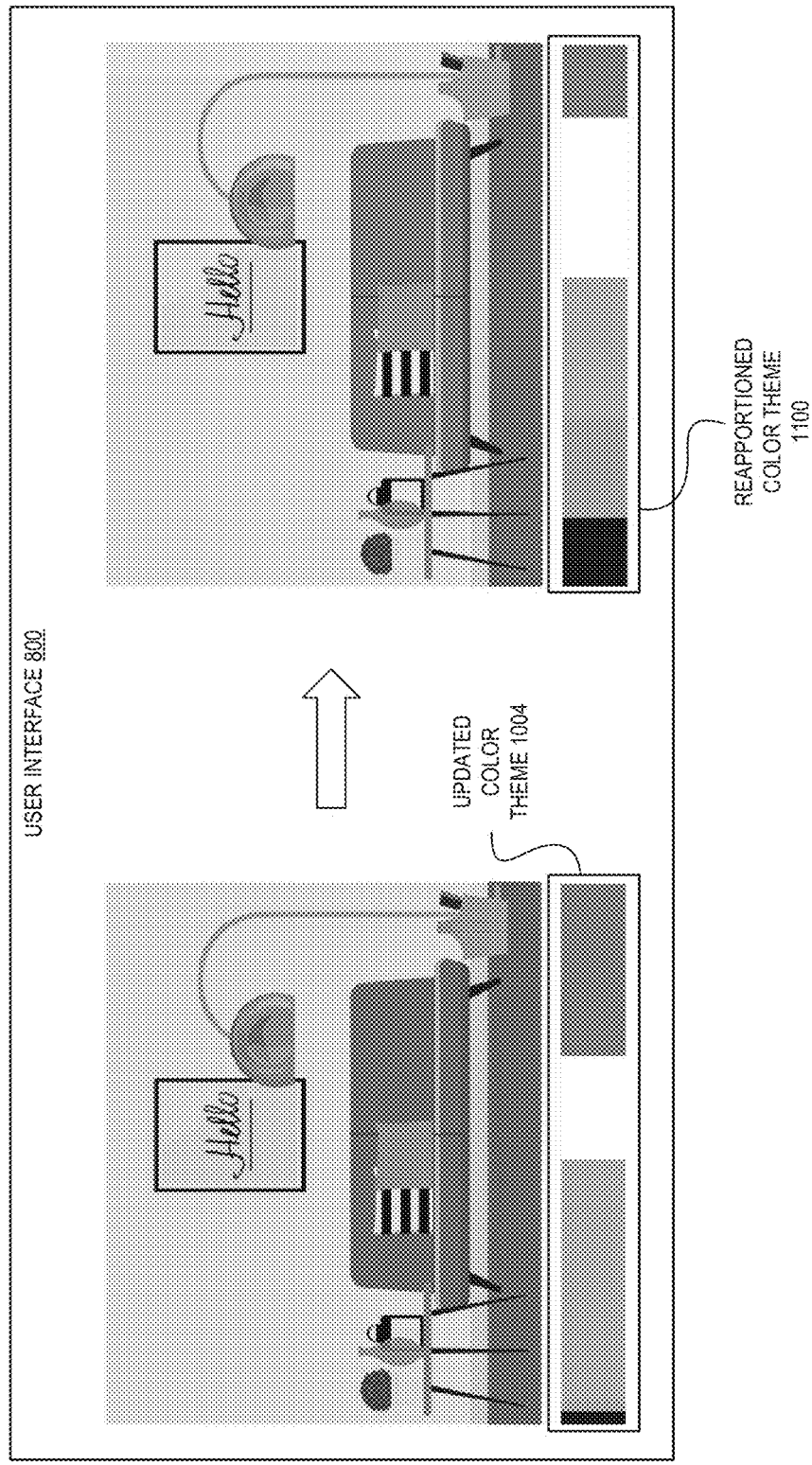

As shown in FIG. 9, when the user selects a variation from the sidebar, it is presented for editing using the underlying color distribution that was used to generate the selected variation 900. For example, the variation color theme 902 is displayed adjacent to the selected variation 900. For example, as shown in FIG. 10, the use selects a color 1000 of the variation color theme 902. As shown in FIG. 9, in some embodiments the variation color theme is represented by a proportional color palette. This causes a color panel 1002 to be displayed in the user interface through which the user selects a new color to replace the selected color, as shown in updated color theme 1004. The updated color theme 1004 is then used to generate the updated variation 1006. Additionally, as shown in FIG. 11, the user is also able to change the proportion of any color in the color theme. For example, from updated color theme 1004, the user changes the proportions of several of the color, resulting in reapportioned color theme 1100. In some embodiments, this is performed by selecting and dragging (or otherwise interacting with) the color theme. Alternatively, the user changes the weights associated with one or more of the colors by changing the weight value to a new value. At each point in this process user has an option of saving a color variation before continuing to further explore color variations for their image.

Figure 12:
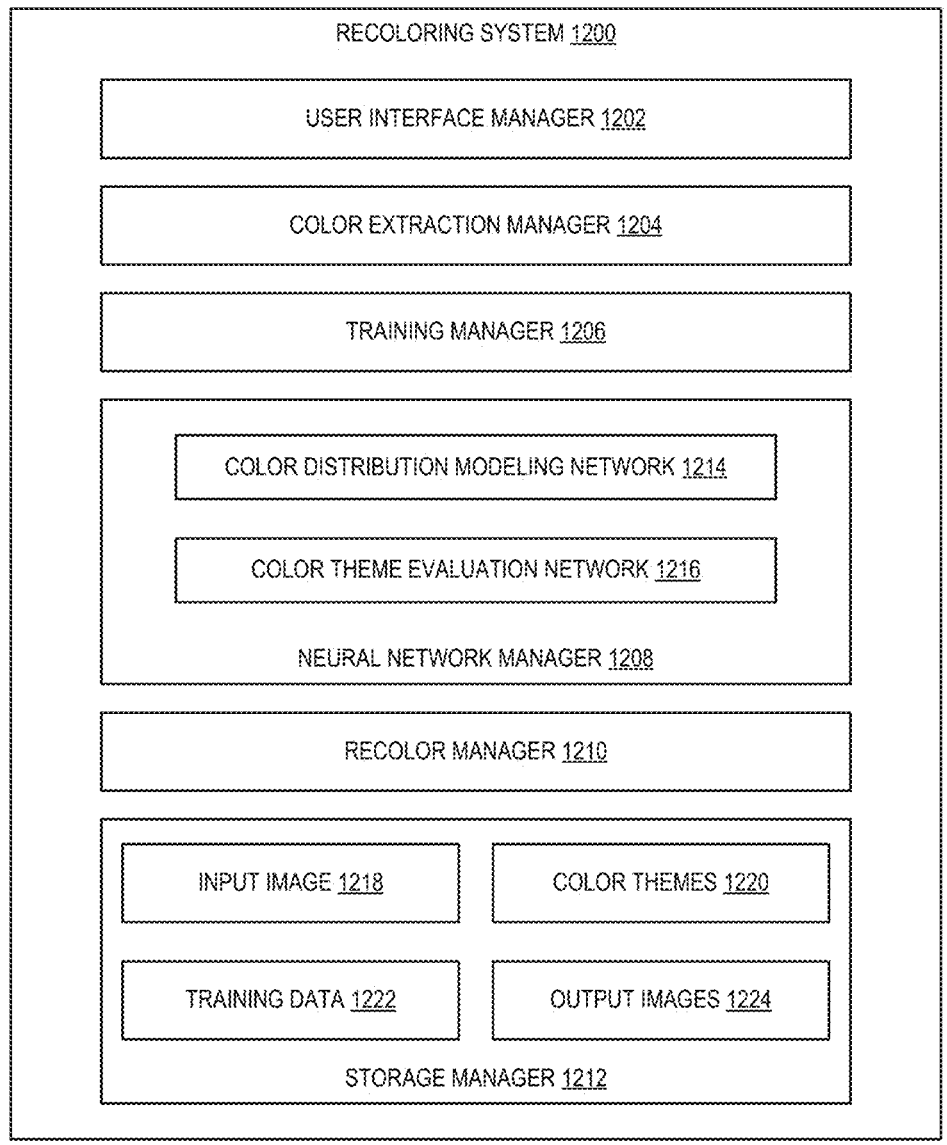
FIG. 12 illustrates a schematic diagram of a recoloring system in accordance with one or more embodiments.

FIG. 12 illustrates a schematic diagram of a recoloring system (e.g., "recoloring system" described above) in accordance with one or more embodiments. As shown, the recoloring system 1200 includes, but is not limited to, user interface manager 1202, color extraction manager 1204, training manager 1206, neural network manager 1208, recolor manager 1210, and storage manager 1212. The neural network manager 1208 includes a color distribution modeling network 1214 and a color theme evaluation network 1216. The storage manager 1212 includes input image 1218, color themes 1220, training data 1222, and output image 1224.

The recoloring system 1200 includes a user interface manager 1202 that allows users to provide input to the recoloring system. For example, the user interface manager 1202 allows users to select one or more images to be analyzed and/or edited. In some embodiments, the user interface manager 1202 enables a user to select one or more image files stored or accessible by storage manager 1212. Additionally, the user interface manager 1202 allows users to request the recoloring system to generate multiple alternative color themes for the input image. Further, the user interface manager 1202 allows users to edit the generated color themes (e.g., change color values, change the proportions of the colors in the color theme, etc.) such that the input image is recolored accordingly.

The recoloring system 1200 also includes color extraction manager 1204. As discussed, color extraction manager 1204 receives the input image 1218 (e.g., a raster image or vector image) and determines the color theme associated with the input image. For example, the color extraction manager 1204 identifies the unique colors in the input image 102 and groups them. In some embodiments, k-means clustering is used to identify groups of colors in the input image. The color extraction manager 1204 also determines weights associated with the colors indicating how prevalent each color (or group of colors) is in the input image. This results in a color theme which, in some embodiments, is visualized as a weighted color palette. The color extraction manager 1204 then samples one or more colors from the color theme to be used as color priors for generating color theme variations. As discussed, in some embodiments, the color extraction manager 1204 samples between 20-40% of the colors from the color theme. However, more, or fewer colors are sampled depending on implementation.

The recoloring system 1200 also includes training manager 1206, which is configured to teach, guide, tune, and/or train one or more neural networks. In particular, the training manager 1206 trains a neural network, such as color distribution modeling network 1214 and color theme evaluation network 1216, based on a plurality of training data (e.g., training data 1222). In some embodiments, the training data used to train the color distribution modeling network includes any collection of color images, as it learns the underlying color distribution of the training images. For example, public and/or private datasets, such as stock image datasets, are used, in some embodiments, for training one or more of the networks. In some embodiments, the training data 1222 includes designer-created palette datasets. In some embodiments, the training dataset includes images from a particular customer, corporation, or other entity whose organization consistently uses specific color themes which are then explored or expanded upon by the color distribution modeling network.

In some embodiments, training manager 1206 trains the color distribution modeling network to model the distribution over the next palette feature. This starts by taking a collection of training palettes (e.g., color themes) and using it as training dataset. For each training sample, a random palette is selected along with a random number of input features to use between 0 and K−1, and the color distribution modeling network is trained to predict the next palette feature. As the color distribution modeling network predicts a probability distribution, instead of directly predicting a delta function over the closest bucket, the target point is convolved with a Gaussian, which is then discretized into the target 64 buckets. The larger the bandwidth of this Gaussian, the more diverse the generated palettes will be. Many such training examples are concatenated together to make each training batch. The color distribution modeling network is trained with a multi-class cross entropy loss. In some embodiments. a batch size of 256 and the Adam optimizer with learning rate 1e-3 are used.

More specifically, the training manager 1206 is configured to access, identify, generate, create, and/or determine training input and utilize the training input to train and fine-tune a neural network. For instance, the training manager 1206 trains the In some embodiments, training manager 1206 trains the color theme evaluation network using a collection of positive-quality and negative-quality examples. For positive quality examples, a random subset between 2 and C colors is obtained from a random high-quality training palette (such as the training palettes used to train color distribution modeling network 1214). To provide limited data augmentation, in some embodiments, the colors of these training palettes are perturbed slightly, (e.g., +/−0.05 in each color channel).

For negative-quality examples, 50% of the time an entirely random palette drawn uniformly from the (−1, 1) range is selected. The remaining 50% of the time the training manager draws from a random palette generated from the palette generation network with a "sampling temperature" drawn uniformly from (1 to 10). The sampling temperature is used to scale the logits of each generated sample by a constant, with higher temperatures making the network less confident in its accuracy. Overall, this sampling procedure is useful in generating a diverse set of palettes that are in the vicinity of the training palette distribution, but do not exactly replicate the input training dataset (as might occur if we set our sampling temperature too low.) Combined with truly random samples, this allows the training examples to cover a wide range of colors.

Given the positive and negative training dataset, the training manager 1206 uses a binary cross-entropy loss to train the color theme evaluation network. In some embodiments, the training manager 1206 trains with a batch size of 256 using the Adam optimizer with learning rate 1e-4. In some embodiments, training is completed once the network has seen approximately 10,000,000 training examples.

For subsets that include a high number of colors, it is sometimes possible for the network to largely memorize the training dataset. As the number of colors in the subset are reduced, this becomes more challenging. To help summarize the palette quality, for a new input palette, embodiments compute the score from the color theme evaluation network for all possible two, three, four, etc. color subsets, and average these quality scores to produce a "K-subset" score. Given large values of K are more likely to suffer from overfitting, for most datasets the score is computed as the average of the two color subsets and three color subsets scores. Qualitatively, this is an estimate of how closely random sets of two or three adjacent colors in the palette match subsets that occur in the training dataset.

As further illustrated in FIG. 12, the recoloring system 1200 includes the neural network manager 1208 that includes color distribution modeling network 1214 and color theme evaluation network 1216. As discussed, color distribution modeling network 1214 is a neural network trained to predict a new color distribution based on one or more color priors. For example, the color values of the color priors (e.g., HSV, RGB, or other color representations), along with corresponding weights, are provided to the color distribution modeling network 1214. In some embodiments, the color distribution modeling network 1214 is an autoregressive model that, given a set of inputs, predicts the next value in the series. For example, if the input is $H_1S_1V_1W_1$ (e.g., the hue, saturation, value, and weight values for a color prior), then the color distribution modeling network 1214 predicts the next value in the series which is the hue value for color 2 (e.g., $H_2$). This value is then added to the input and the network is run again to predict the next value in the series (e.g., $S_2$), and so on until the new color theme has been completely generated. This process is repeated until multiple color themes 1220 have been generated from the color priors. These color themes are then provided to color theme evaluation network 1216. Color theme evaluation network 1216, as discussed, generates a score for each generated color theme and ranks the generated color themes based on their respective scores. The top scoring color themes are then used by recolor manager 1210 to generate recolored output images 1224 with different color themes.

As further illustrated in FIG. 12, the recoloring system 1200 also includes a recolor manager 1210. As discussed, recolor manager receives both the input color theme (e.g., input color palette) and the generated color themes (e.g., generated color palettes) and determines mappings between the input color palette and the generated color palettes. These mappings are then used by the recolor manager to recolor the input image to create the recolored output images that now have the generated color palettes.

As illustrated in FIG. 12, the recoloring system 1200 also includes the storage manager 1212. The storage manager 1212 maintains data for the recoloring system 1200. The storage manager 1212 maintains data of any type, size, or kind as necessary to perform the functions of the recoloring system 1200. The storage manager 1212, as shown in FIG. 12, input image(s) 1218. The input image(s) 1218 include at least one digital image provided by a user, such as a raster image or a vector graphic image. The storage manager 1212 also includes color themes 1220. The color themes 1220 have been generated by the color distribution modeling network, as discussed above.

As further illustrated in FIG. 12, the storage manager 1212 also includes the training data 1222. The training data 1222 includes a plurality of digital training images used to train at least one of the color distribution modeling network or the color theme evaluation network. In particular, in one or more embodiments, the training data 1222 include digital training images utilized by the training manager 1206 to train one or more neural networks to generate multiple color themes and to score the generated color themes according to aesthetic quality. The storage manager 1212 also includes output image(s) 1224. As discussed, the output image(s) 1224 include recolored versions of the input image that have been recolored from the color theme of the input image to the generated color themes.

Each of the components 1202-1212 of the recoloring system 1200 and their corresponding elements (as shown in FIG. 12) are in communication with one another using any suitable communication technologies. It will be recognized that although components 1202-1212 and their corresponding elements are shown to be separate in FIG. 12, any of components 1202-1212 and their corresponding elements are combinable into fewer components, such as into a single facility or module, divided into more components, or configured into different components as serve a particular embodiment.

The components 1202-1212 and their corresponding elements, in various embodiments, comprise software, hardware, or both. For example, in some embodiments, the components 1202-1212 and their corresponding elements comprise one or more instructions stored on a computer-readable storage medium and executable by processors of one or more computing devices. When executed by the one or more processors, the computer-executable instructions of the recoloring system 1200 cause a client device and/or a server device to perform the methods described herein. Alternatively, in some embodiments, the components 1202-1212 and their corresponding elements comprise hardware, such as a special purpose processing device to perform a certain function or group of functions. Additionally, in some embodiments, the components 1202-1212 and their corresponding elements comprise a combination of computer-executable instructions and hardware.

Furthermore, the components 1202-1212 of the recoloring system 1200 may, for example, be implemented as one or more stand-alone applications, as one or more modules of an application, as one or more plug-ins, as one or more library functions or functions that are called by other applications, and/or as a cloud-computing model. Thus, the components 1202-1212 of the recoloring system 1200 are implementable as a stand-alone application, such as a desktop or mobile application. Furthermore, the components 1202-1212 of the recoloring system 1200 are implementable as one or more web-based applications hosted on a remote server. Alternatively, or additionally, the components of the recoloring system 1200 are implementable in a suit of mobile device applications or "apps." To illustrate, the components of the recoloring system 1200 are implementable in a digital design application, including but not limited to ADOBE® PHOTOSHOP®, ADOBE® PREMIERE® PRO, etc., or a cloud-based suite of applications such as CREATIVE CLOUD®. "ADOBE®," "PHOTOSHOP®," "ADOBE PREMIERE®," and "CREATIVE CLOUD®" are either a registered trademark or trademark of Adobe Inc. in the United States and/or other countries.

Figure 13:
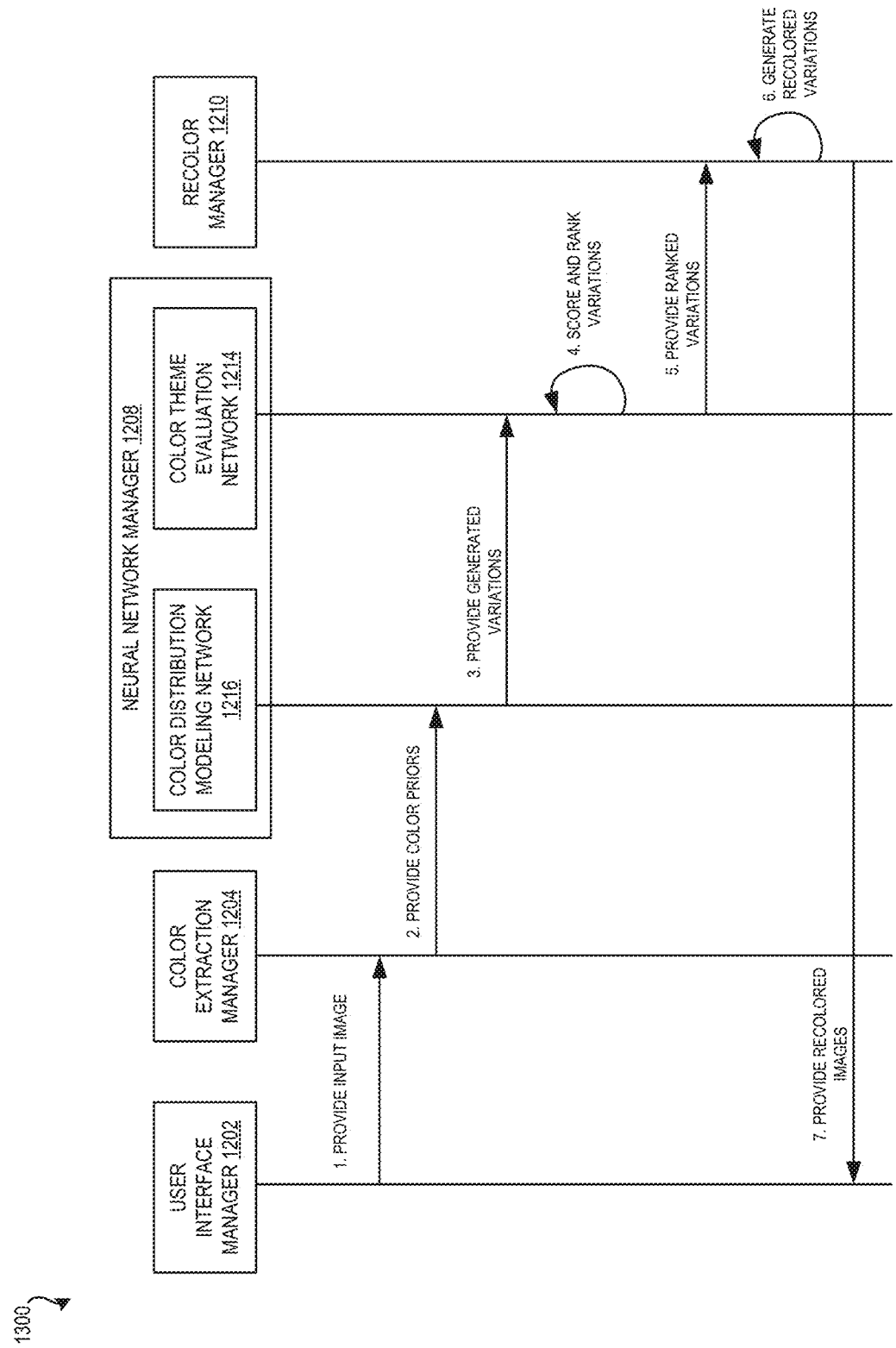
FIG. 13 illustrates a sequence diagram of generating color theme variations in accordance with one or more embodiments.

FIG. 13 illustrates a sequence diagram of generating color theme variations in accordance with one or more embodiments. As shown in FIG. 13, at numeral 1, the user providers an input image to color extraction manager 1204 via user interface manager 1202. The color extraction manager determines the color theme of the input image. As discussed, the color theme includes a weighted color palette of one or more colors included in the input image. In some embodiments, a clustering technique is used to identify the colors to be included in the color theme for the input image. Once the color theme has been identified, then the colors in the color theme are sampled to determine one or more color priors. For example, 20-40% of the colors in the color theme are randomly sampled, in some embodiments. Alternatively, more, or fewer colors are sampled to be used as color priors.

At numeral 2, the color priors are provided to color distribution modeling network 1214. The color distribution modeling network uses the color priors to generate multiple color variations. As discussed, these variations are generated by sampling a probability distribution and therefore do not always result in aesthetically pleasing color themes. As such, at numeral 3, the generated color theme variations are provided to color theme evaluation network 1216. The color theme evaluation network scores the generated color theme variations based on how closely they resemble color themes that were used to train the color theme evaluation network. These color themes are then ranked according to the scores at numeral 4.

At numeral 5, the top ranked generated color theme variations are provided to recolor manager 1210. For example, the top ten color theme variations, or any with a score above a threshold, or other metric defining a subset of the highest ranked variations are provided to the recolor manager. The recolor manager implements a recolor technique, such as palette flow techniques described above. However, in various embodiments other recoloring techniques are implemented by recolor manager 1210. This results in multiple recolored output images, each having one of the top ranked color theme variations. At numeral 7, these recolored images are output via user interface manager 1202 to the user for review.

Figure 14:
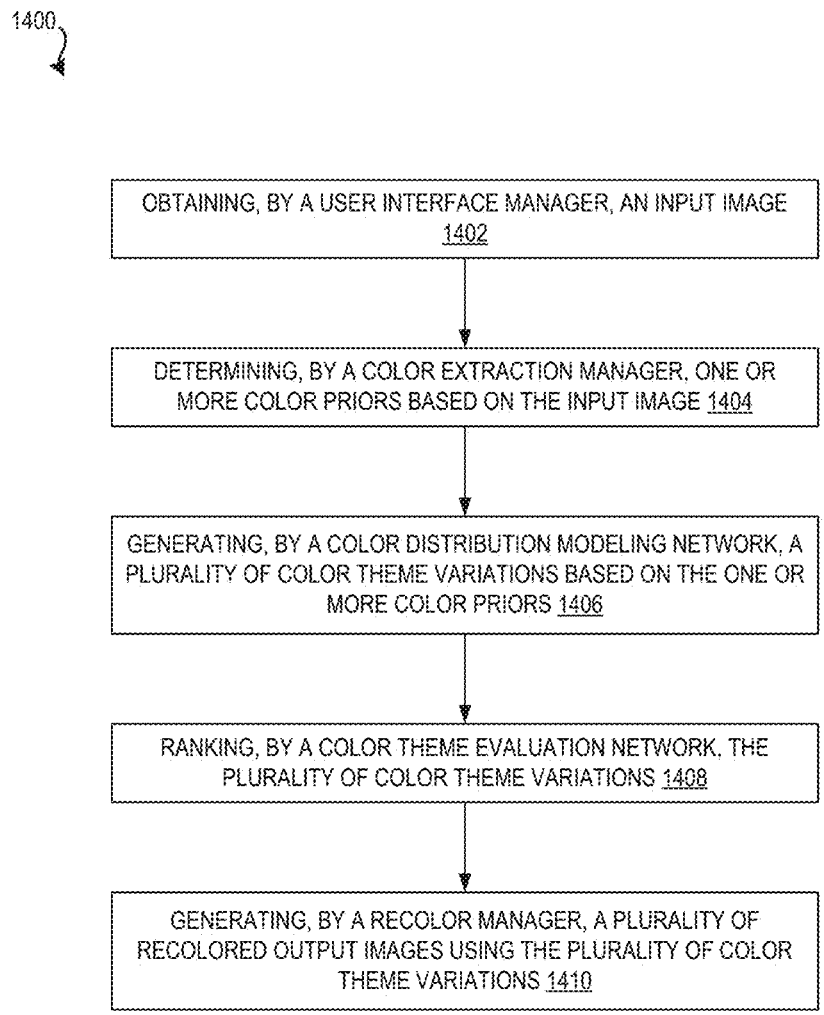
FIG. 14 illustrates a flowchart of a series of acts in a method of generating color theme variations in accordance with one or more embodiments.

FIGS. 1-13, the corresponding text, and the examples, provide a number of different systems and devices that allows a user to generate color theme variations for an input image. In addition to the foregoing, embodiments can also be described in terms of flowcharts comprising acts and steps in a method for accomplishing a particular result. For example, FIG. 14 illustrates a flowchart of an exemplary method in accordance with one or more embodiments. The method described in relation to FIG. 14 are, in some embodiments, performed with fewer or more steps/acts or the steps/acts are performed in differing orders. Additionally, the steps/acts described herein are, in some embodiments, repeated or performed in parallel with one another or in parallel with different instances of the same or similar steps/acts.

FIG. 14 illustrates a flowchart 1400 of a series of acts in a method of generating color theme variations in accordance with one or more embodiments. In one or more embodiments, the method 1400 is performed in a digital medium environment that includes the recoloring system 1200. The method 1400 is intended to be illustrative of one or more methods in accordance with the present disclosure and is not intended to limit potential embodiments. Alternative embodiments include additional, fewer, or different steps than those articulated in FIG. 14.

As illustrated in FIG. 14, the method 1400 includes an act 1402 of obtaining, by a user interface manager, an input image. For example, in some embodiments the user interface is part of a digital design application and the image is obtained via the user opening the image in the digital design application, creating the image using the digital design applications, etc. In some embodiments, the user selects the image using the user interface manager via a local or remote file system, cloud-based storage service, or other storage location.

As illustrated in FIG. 14, the method 1400 further includes an act 1404 of determining, by a color extraction manager, one or more color priors based on the input image. In some embodiments, determining the one or more color priors include identifying a plurality of unique colors in the input image, clustering the plurality of unique colors into a plurality of clusters, and determining a color theme associated with the input image, wherein each color of the color theme is associated with each of the plurality of clusters. For example, in some embodiments, k-means clustering, or other clustering techniques are used to determine clusters of colors that are included in the input image. A representative color from each color, such as the cluster centroid or medoid, is then used to generate a color theme for the input image. The color priors are obtained by randomly sampling a subset of these colors from the color theme.

As illustrated in FIG. 14, the method 1400 further includes an act 1406 of generating, by a color distribution modeling network, a plurality of color theme variations based on the one or more color priors. In some embodiments, generating the plurality of color theme variations includes encoding the one or more color priors into an input tensor that represents color space values and weight values associated with each of the one or more color priors, predicting a color distribution based on the one or more color priors, and sampling the color distribution to obtain a next color space value or weight value. In some embodiments, generating the plurality of color theme variations further includes updating the input tensor to include the next color space value, and iteratively predicting subsequent color space or weight values until the plurality of color theme variations have been predicted. In some embodiments, the color distribution modeling network is trained by a training manager to model the color distribution of a training dataset, the training dataset including a plurality of color images having different color themes.

As illustrated in FIG. 14, the method 1400 further includes an act 1408 of ranking, by a color theme evaluation network, the plurality of color theme variations. In some embodiments, ranking the color theme variations includes receiving the plurality of color theme variations, predicting a score for each color theme variation, and ranking the plurality of color theme variations based on each color theme's predicted score. In some embodiments, predicting the score for each color theme variation includes predicting a plurality of scores for a plurality of subsets of colors of a first color theme variation, and determining a score for the first color theme variation by combining the plurality of scores. In some embodiments, the color theme evaluation network is trained by a training manager to predict a likelihood that an input color theme was included in a training dataset and to generate a score based on the likelihood.

As illustrated in FIG. 14, the method 1400 further includes an act 1410 of generating, by a recolor manager, a plurality of recolored output images using the plurality of color theme variations. For example, palette flow, or other color transfer techniques, are used in various embodiments, to recolor the input image to have the color theme corresponding to one of the color theme variations. In some embodiments, the highest ranked color theme variations are used to generate recolored images.

Figure 15:
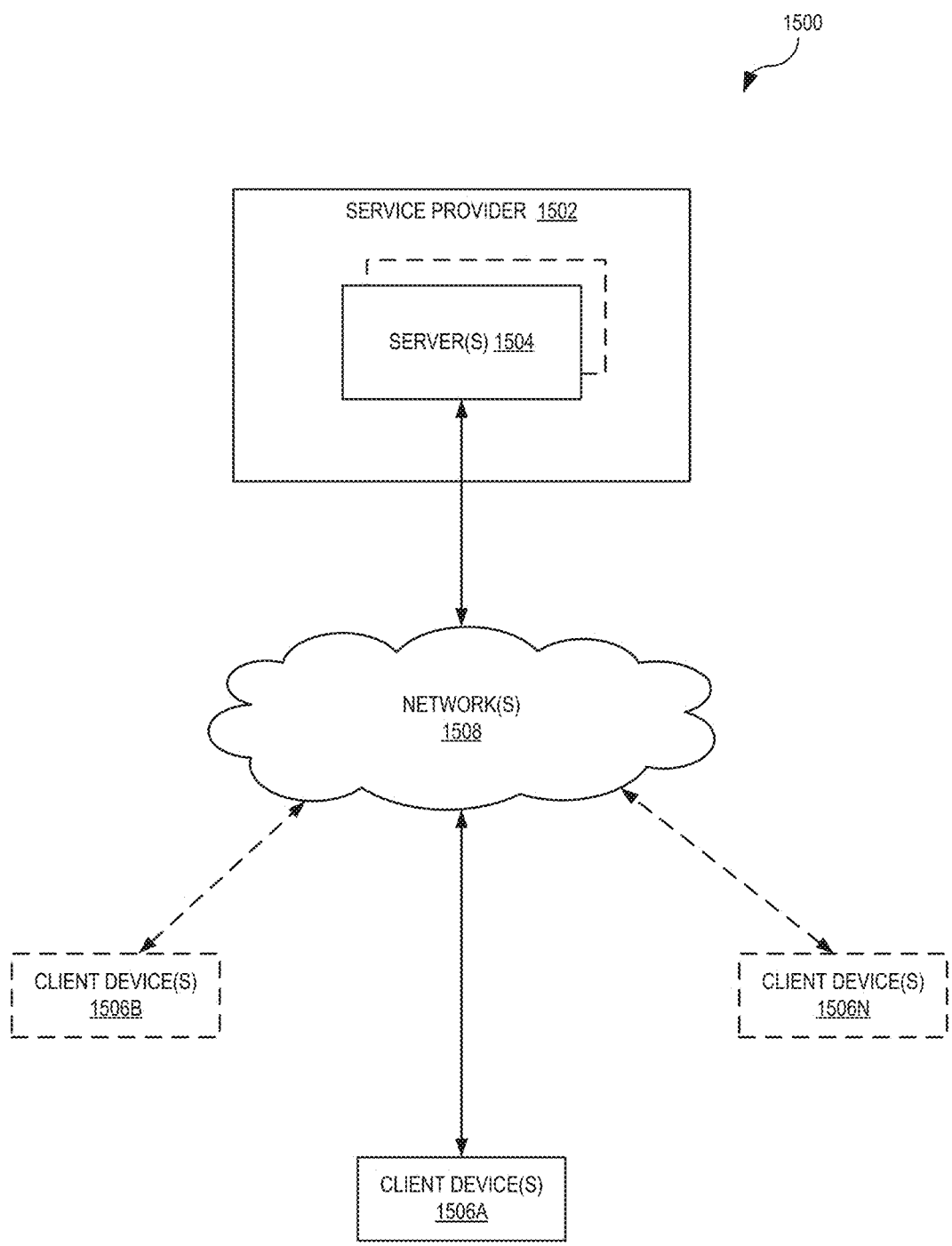
FIG. 15 illustrates a schematic diagram of an exemplary environment in which the recoloring system operates in accordance with one or more embodiments.

FIG. 15 illustrates a schematic diagram of an exemplary environment 1500 in which the recoloring system 1200 operates in accordance with one or more embodiments. In one or more embodiments, the environment 1500 includes a service provider 1502 which includes one or more servers 1504 connected to a plurality of client devices 1506A-1506N via one or more networks 1508. The client devices 1506A-1506N, the one or more networks 1508, the service provider 1502, and the one or more servers 1504 communicate with each other or other components using any communication platforms and technologies suitable for transporting data and/or communication signals, including any known communication technologies, devices, media, and protocols supportive of remote data communications, examples of which will be described in more detail below with respect to FIG. 16.

Although FIG. 15 illustrates a particular arrangement of the client devices 1506A-1506N, the one or more networks 1508, the service provider 1502, and the one or more servers 1504, various additional arrangements are possible. For example, the client devices 1506A-1506N directly communicate with the one or more servers 1504, bypassing the network 1508. Or alternatively, the client devices 1506A-1506N directly communicate with each other. The service provider 1502, in some embodiments, is a public cloud service provider which owns and operates their own infrastructure in one or more data centers and provides this infrastructure to customers and end users on demand to host applications on the one or more servers 1504. The servers include one or more hardware servers (e.g., hosts), each with its own computing resources (e.g., processors, memory, disk space, networking bandwidth, etc.) which are securely divided between multiple customers, each of which host their own applications on the one or more servers 1504. In some embodiments, the service provider, in some embodiments, is a private cloud provider which maintains cloud infrastructure for a single organization. The one or more servers 1504, in some embodiments, similarly include one or more hardware servers, each with its own computing resources, which are divided among applications hosted by the one or more servers for use by members of the organization or their customers.

Similarly, although the environment 1500 of FIG. 15 is depicted as having various components, the environment 1500 have additional or alternative components. For example, the environment 1500, in some embodiments, is implemented on a single computing device with the recoloring system 1200. In particular, the recoloring system 1200 is, in some embodiments, implemented in whole or in part on the client device 1502A.

As illustrated in FIG. 15, the environment 1500 includes client devices 1506A-1506N. The client devices 1506A-1506N comprise any computing device. For example, client devices 1506A-1506N comprise one or more personal computers, laptop computers, mobile devices, mobile phones, tablets, special purpose computers, TVs, or other computing devices, including computing devices described below with regard to FIG. 16. Although three client devices are shown in FIG. 15, it will be appreciated that client devices 1506A-1506N comprise any number of client devices (greater or smaller than shown).

Moreover, as illustrated in FIG. 15, the client devices 1506A-1506N and the one or more servers 1504 communicate via one or more networks 1508. The one or more networks 1508 represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1508 include any suitable network over which the client devices 1506A-1506N access service provider 1502 and server 1504, or vice versa. The one or more networks 1508 will be discussed in more detail below with regard to FIG. 16.

In addition, the environment 1500, in some embodiments, includes one or more servers 1504. The one or more servers 1504 generate, store, receive, and transmit any type of data, including input image(s) 1218, color themes 1220, training data 1222, output images 1224, or other information. For example, a server 1504 receives data from a client device, such as the client device 1506A, and send the data to another client device, such as the client device 1502B and/or 1502N. The server 1504 also transmits electronic messages between one or more users of the environment 1500. In one example embodiment, the server 1504 is a data server. The server 1504, in some embodiments, also comprises a communication server or a web-hosting server. Additional details regarding the server 1504 will be discussed below with respect to FIG. 16.

As mentioned, in one or more embodiments, the one or more servers 1504 includes or implements at least a portion of the recoloring system 1200. In particular, the recoloring system 1200 comprises an application running on the one or more servers 1504 or a portion of the recoloring system 1200 is downloaded from the one or more servers 1504. For example, the recoloring system 1200, in some embodiments, includes a web hosting application that allows the client devices 1506A-1506N to interact with content hosted at the one or more servers 1504. To illustrate, in one or more embodiments of the environment 1500, one or more client devices 1506A-1506N access a webpage supported by the one or more servers 1504. In particular, the client device 1506A runs a web application (e.g., a web browser) to allow a user to access, view, and/or interact with a webpage or website hosted at the one or more servers 1504.

Upon the client device 1506A accessing a webpage or other web application hosted at the one or more servers 1504, in one or more embodiments, the one or more servers 1504 provide access to one or more digital images (e.g., the input image data 1218, such as camera roll or an individual's personal photos) stored at the one or more servers 1504.

Moreover, the client device 1506A receives a request (i.e., via user input) to generate variations and provides the request to the one or more servers 1504. Upon receiving the request, the one or more servers 1504 automatically perform the methods and processes described above to generate color theme variations and recolor the input image accordingly. The one or more servers 1504 provide the recolored images, to the client device 1506A for display to the user.

As just described, the recoloring system 1200 is, in various embodiments, implemented in whole, or in part, by the individual elements 1502-1508 of the environment 1500. It will be appreciated that although certain components of the recoloring system 1200 are described in the previous examples with regard to particular elements of the environment 1500, various alternative implementations are possible. For instance, in one or more embodiments, the recoloring system 1200 is implemented on any of the client devices 1506A-N. Similarly, in one or more embodiments, the recoloring system 1200 is implemented on the one or more servers 1504. Moreover, different components and functions of the recoloring system 1200 are implemented separately among client devices 1506A-1506N, the one or more servers 1504, and the network 1508.

Embodiments of the present disclosure comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein are implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media, in various embodiments, are any available media that are accessible by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which is used to store desired program code means in the form of computer-executable instructions or data structures and which is accessible by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media include a network and/or data links which are usable to carry desired program code means in the form of computer-executable instructions or data structures and which are accessible by a general purpose or special purpose computer. Combinations of the above should also be included within the scope of computer-readable media.

Further, upon reaching various computer system components, program code means in the form of computer-executable instructions or data structures are transferrable automatically from transmission media to non-transitory computer-readable storage media (devices) (or vice versa). For example, computer-executable instructions or data structures received over a network or data link are buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) are included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions are, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure is, in various embodiments, practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure, in some embodiments, is practiced in distributed system environments where local and remote computer systems, which are linked (either by hardwired data links, wireless data links, or by a combination of hardwired and wireless data links) through a network, both perform tasks. In a distributed system environment, program modules are located in both local and remote memory storage devices.

Embodiments of the present disclosure are implementable in cloud computing environments. In this description, "cloud computing" is defined as a model for enabling on-demand network access to a shared pool of configurable computing resources. For example, cloud computing is employable in the marketplace to offer ubiquitous and convenient on-demand access to the shared pool of configurable computing resources. The shared pool of configurable computing resources is rapidly provisioned via virtualization and released with low management effort or service provider interaction, and then scaled accordingly.

A cloud-computing model, in various embodiments, includes various characteristics such as, for example, on-demand self-service, broad network access, resource pooling, rapid elasticity, measured service, and so forth. A cloud-computing model also exposes various service models, such as, for example, Software as a Service ("SaaS"), Platform as a Service ("PaaS"), and Infrastructure as a Service ("IaaS"). A cloud-computing model also is deployable using different deployment models such as private cloud, community cloud, public cloud, hybrid cloud, and so forth. In this description and in the claims, a "cloud-computing environment" is an environment in which cloud computing is employed.

Figure 16:
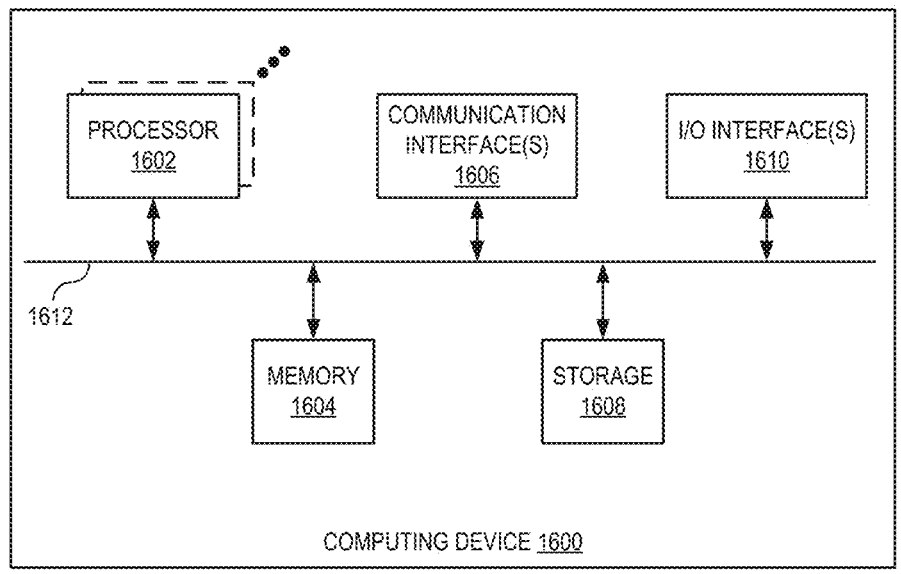
FIG. 16 illustrates a block diagram of an exemplary computing device in accordance with one or more embodiments.

FIG. 16 illustrates, in block diagram form, an exemplary computing device 1600 that is configured to perform one or more of the processes described above. One will appreciate that one or more computing devices such as the computing device 1600 implement the recoloring system. As shown by FIG. 16, the computing device comprises a processor 1602, memory 1604, one or more communication interfaces 1606, a storage device 1608, and one or more I/O devices/interfaces 1610. In certain embodiments, the computing device 1600 includes fewer or more components than those shown in FIG. 16. Components of computing device 1600 shown in FIG. 16 will now be described in additional detail.

In particular embodiments, processor(s) 1602 includes hardware for executing instructions, such as those making up a computer program. As an example, and not by way of limitation, to execute instructions, processor(s) 1602 retrieves (or fetches) the instructions from an internal register, an internal cache, memory 1604, or a storage device 1608 and decode and execute them. In various embodiments, the processor(s) 1602 includes one or more central processing units (CPUs), graphics processing units (GPUs), field programmable gate arrays (FPGAs), systems on chip (SoC), or other processor(s) or combinations of processors.

The computing device 1600 includes memory 1604, which is coupled to the processor(s) 1602. The memory 1604 is used for storing data, metadata, and programs for execution by the processor(s). The memory 1604 includes one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1604 is internal or distributed memory.

The computing device 1600 further includes one or more communication interfaces 1606. A communication interface 1606 includes hardware, software, or both. The communication interface 1606 provides one or more interfaces for communication (such as, for example, packet-based communication) between the computing device and one or more other computing devices 1600 or one or more networks. As an example and not by way of limitation, communication interface 1606 includes a network interface controller (NIC) or network adapter for communicating with an Ethernet or other wire-based network or a wireless NIC (WNIC) or wireless adapter for communicating with a wireless network, such as a WI-FI. The computing device 1600 further includes a bus 1612. The bus 1612 comprises hardware, software, or both that couples components of computing device 1600 to each other.

The computing device 1600 includes a storage device 1608 includes storage for storing data or instructions. As an example, and not by way of limitation, storage device 1608 comprises a non-transitory storage medium described above. The storage device 1608 includes a hard disk drive (HDD), flash memory, a Universal Serial Bus (USB) drive or a combination these or other storage devices. The computing device 1600 also includes one or more input or output ("I/O") devices/interfaces 1610, which are provided to allow a user to provide input to (such as user strokes), receive output from, and otherwise transfer data to and from the computing device 1600. These I/O devices/interfaces 1610 include a mouse, keypad or a keyboard, a touch screen, camera, optical scanner, network interface, modem, other known I/O devices or a combination of such I/O devices/interfaces 1610. The touch screen is activated with a stylus or a finger.

The I/O devices/interfaces 1610 include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1610 is configured to provide graphical data to a display for presentation to a user. The graphical data is representative of one or more graphical user interfaces and/or any other graphical content as serves a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments include other specific forms without departing from its spirit or essential characteristics. The described embodiments are to be considered in all respects only as illustrative and not restrictive. For example, the methods described herein are, in some embodiments, performed with less or more steps/acts or the steps/acts are performed in differing orders. Additionally, the steps/acts described herein are repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A computer-implemented method comprising:
 obtaining, by a user interface manager, an input image;
 determining, by a color extraction manager, one or more color priors based on the input image;
 encoding the one or more color priors into an input tensor that represents color space values and weight values associated with each of the one or more color priors;
 predicting, by a color distribution modeling network, a color space value of a color of a color theme variation, wherein the color is based on the one or more color priors, wherein the color distribution modeling network has been trained to model a color distribution of a training dataset, the training dataset including a plurality of color images having different color themes;
generating, by the color distribution modeling network, a plurality of color theme variations by iteratively predicting one or more colors of each color theme variation of the plurality of color theme variations;
ranking, by a color theme evaluation network, the plurality of color theme variations to obtain a plurality of ranked color theme variations; and
recoloring, by a recolor manager, the input image to generate a plurality of recolored output images using a number of top ranked color theme variations of the plurality of ranked color theme variations, wherein recoloring includes changing pixel color values of the input image according to the plurality of color theme variations.

2. The computer-implemented method of claim 1, wherein determining, by a color extraction manager, one or more color priors based on the input image, further comprises:
identifying a plurality of unique colors in the input image;
clustering the plurality of unique colors into a plurality of clusters; and
determining a color theme associated with the input image, wherein each color of the color theme is associated with each of the plurality of clusters.

3. The computer-implemented method of claim 2, further comprising:
sampling a subset of colors from the color theme to use as the one or more color priors.

4. The computer-implemented method of claim 1, wherein the color space value includes a next color space value or weight value.

5. The computer-implemented method of claim 4, wherein the color space value includes the next color space value, further comprising:
updating the input tensor to include the next color space value.

6. The computer-implemented method of claim 1, wherein ranking, by a color theme evaluation network, the plurality of color theme variations, further comprises:
receiving the plurality of color theme variations;
predicting a score for each color theme variation; and
ranking the plurality of color theme variations based on each color theme's predicted score.

7. The computer-implemented method of claim 6, wherein predicting a score for each color theme variation, further comprises:
predicting a plurality of scores for a plurality of subsets of colors of a first color theme variation; and
determining a score for the first color theme variation by combining the plurality of scores.

8. The computer-implemented method of claim 1, wherein the color theme evaluation network is trained by a training manager to predict a likelihood that an input color theme was included in a training dataset and to generate a score based on the likelihood.

9. A system, comprising:
at least one processor; and
a memory including instructions stored thereon which, when executed by the at least one processor, cause the system to:
obtain an input image;
determine one or more color priors based on the input image;
encode the one or more color priors into an input tensor that represents color space values and weight values associated with each of the one or more color priors;
predict, using a first machine learning model, a color space value of a color of a color theme variation, wherein the color is based on the one or more color priors, and wherein the first machine learning model has been trained to model a color distribution of a training dataset, the training dataset including a plurality of color images having different color themes;
generate a plurality of color theme variations by iteratively predicting one or more colors of each color theme variation of the plurality of color theme variations;
rank, using a second machine learning model, the plurality of color theme variations to obtain a plurality of ranked color theme variations; and
recolor the input image to generate a plurality of recolored output images using a number of top ranked color theme variations of the plurality of ranked color theme variations, wherein recoloring includes changing pixel color values of the input image according to the plurality of color theme variations.

10. The system of claim 9, wherein to determine one or more color priors based on the input image, the system is further configured to:
identify a plurality of unique colors in the input image;
cluster the plurality of unique colors into a plurality of clusters; and
determine a color theme associated with the input image, wherein each color of the color theme is associated with each of the plurality of clusters.

11. The system of claim 10, wherein the system is further configured to sample a subset of colors from the color theme to use as the one or more color priors.

12. The system of claim 9, wherein the color space value includes a next color space value or weight value.

13. The system of claim 12, wherein the color space value includes the next color space value and wherein the system is further configured to:
update the input tensor to include the next color space value.

14. The system of claim 9, wherein to rank the plurality of color theme variations, the system is further configured to:
receive the plurality of color theme variations;
predict a score for each color theme variation; and
rank the plurality of color theme variations based on each color theme's predicted score.

15. The system of claim 14, wherein to predict a score for each color theme variation, the color theme evaluation network second machine learning model is further configured to:
predict a plurality of scores for a plurality of subsets of colors of a first color theme variation; and
determine a score for the first color theme variation by combining the plurality of scores.

16. The system of claim 9, wherein the second machine learning model is trained to predict a likelihood that an input color theme was included in a training dataset and to generate a score based on the likelihood.

17. A system, comprising:
means for obtaining an input image;
means for determining one or more color priors based on the input image;

means for encoding the one or more color priors into an input tensor that represents color space values and weight values associated with each of the one or more color priors;

means for predicting a color space value of a color of a color theme variation using a machine learning model, wherein the color is based on the one or more color priors and wherein the machine learning model has been trained to model a color distribution of a training dataset, the training dataset including a plurality of color images having different color themes;

means for generating a plurality of color theme variations by iteratively predicting one or more colors of each color theme variation of the plurality of color theme variations;

means for ranking the plurality of color theme variations to obtain a plurality of ranked color theme variations; and means for recoloring the input image to generate a plurality of recolored output images using a number of top ranked color theme variations of the plurality of ranked color theme variations.

18. The system of claim 17, wherein the color space value includes a next color space value or weight value, wherein recoloring includes changing pixel color values of the input image according to the plurality of color theme variations.

19. The system of claim 18, wherein the color space value includes the next color space value, further comprising:

means for updating the input tensor to include the next color space value.

20. The system of claim 17, wherein the means for ranking the plurality of color theme variations, further comprises:

means for receiving the plurality of color theme variations;

means for predicting a score for each color theme variation; and means for ranking the plurality of color theme variations based on each color theme's predicted score.

* * * * *